US007664736B2

(12) United States Patent
Jung et al.

(10) Patent No.: US 7,664,736 B2
(45) Date of Patent: Feb. 16, 2010

(54) OBTAINING USER ASSISTANCE

(75) Inventors: Edward K. Y. Jung, Bellevue, WA (US); Royce A. Levien, Lexington, MA (US); Mark A. Malamud, Seattle, WA (US); John D. Rinaldo, Jr., Bellevue, WA (US)

(73) Assignee: Searete LLC, Bellevue, WA (US)

( * ) Notice: Subject to any disclaimer, the term of this patent is extended or adjusted under 35 U.S.C. 154(b) by 419 days.

(21) Appl. No.: 11/037,825

(22) Filed: Jan. 18, 2005

(65) Prior Publication Data

US 2006/0161526 A1 Jul. 20, 2006

(51) Int. Cl.
*G06F 17/30* (2006.01)

(52) U.S. Cl. ............................ 707/3; 707/10; 707/102; 707/206

(58) Field of Classification Search ...................... 707/3
See application file for complete search history.

(56) References Cited

U.S. PATENT DOCUMENTS

| | | | | |
|---|---|---|---|---|
| 5,287,102 | A | 2/1994 | McKiel, Jr. | |
| 5,388,251 | A | 2/1995 | Makino et al. | |
| 5,812,977 | A | 9/1998 | Douglas | |
| 5,825,355 | A | 10/1998 | Palmer et al. | |
| 5,877,757 | A | 3/1999 | Baldwin et al. | |
| 5,887,171 | A | 3/1999 | Tada et al. | |
| 5,923,325 | A * | 7/1999 | Barber et al. | 715/711 |
| 5,938,721 | A * | 8/1999 | Dussell et al. | 701/211 |
| 5,991,739 | A * | 11/1999 | Cupps et al. | 705/26 |
| 6,112,181 | A | 8/2000 | Shear et al. | |
| 6,230,170 | B1 | 5/2001 | Zellweger et al. | |
| 6,256,378 | B1 * | 7/2001 | Iggulden et al. | 379/102.03 |
| 6,462,660 | B1 | 10/2002 | Cannon et al. | |
| 6,466,899 | B1 | 10/2002 | Yano et al. | |
| 6,542,814 | B2 | 4/2003 | Polidi et al. | |
| 6,584,496 | B1 * | 6/2003 | Ludtke | 709/217 |
| 6,727,830 | B2 | 4/2004 | Lui et al. | |
| 6,788,313 | B1 | 9/2004 | Heil | |
| 6,799,205 | B2 | 9/2004 | Ludtke | |
| 6,816,881 | B1 * | 11/2004 | Mohindra et al. | 709/203 |
| 6,829,668 | B2 | 12/2004 | Keskar et al. | |
| 6,874,037 | B1 | 3/2005 | Abram et al. | |
| 6,882,712 | B1 * | 4/2005 | Iggulden et al. | 379/102.03 |
| 6,892,936 | B2 | 5/2005 | Riggert et al. | 235/375 |
| 6,920,612 | B2 | 7/2005 | Makinen | |

(Continued)

FOREIGN PATENT DOCUMENTS

JP 2003-114897 4/2003

OTHER PUBLICATIONS

U.S. Appl. No. 11/528,480, Jung et al.

(Continued)

*Primary Examiner*—Don Wong
*Assistant Examiner*—Binh V Ho
(74) *Attorney, Agent, or Firm*—Suiter Swantz pc llo

(57) ABSTRACT

An apparatus, device, method, computer program product, and system that searches a plurality of end user assistances respectively corresponding to a plurality of items for an end user assistance correlating with a user-selected item. Each end user assistance of the plurality of end user assistances respectively having been obtained in response to the prior presence within a geographic locale of the corresponding item.

24 Claims, 36 Drawing Sheets

U.S. PATENT DOCUMENTS

| | | | | |
|---|---|---|---|---|
| 7,043,691 | B1 | 5/2006 | Kwon et al. | |
| 7,055,737 | B1 * | 6/2006 | Tobin et al. | 235/375 |
| 7,082,365 | B2 | 7/2006 | Sheha et al. | |
| 7,129,927 | B2 | 10/2006 | Mattsson | |
| 7,212,827 | B1 | 5/2007 | Vesschl | |
| 7,277,884 | B2 | 10/2007 | Vadai et al. | |
| 2002/0007225 | A1 | 1/2002 | Costello et al. | 700/99 |
| 2002/0023144 | A1 * | 2/2002 | Linyard et al. | 709/218 |
| 2002/0032497 | A1 | 3/2002 | Jorgenson et al. | |
| 2002/0062280 | A1 * | 5/2002 | Zachariassen et al. | 705/39 |
| 2002/0069030 | A1 | 6/2002 | Xydis | |
| 2002/0075243 | A1 | 6/2002 | Newton | |
| 2002/0105550 | A1 | 8/2002 | Biebesheimer et al. | |
| 2002/0152173 | A1 | 10/2002 | Rudd | |
| 2002/0164997 | A1 | 11/2002 | Parry | |
| 2003/0018742 | A1 * | 1/2003 | Imago | 709/214 |
| 2003/0032426 | A1 | 2/2003 | Gilbert et al. | |
| 2003/0043178 | A1 | 3/2003 | Gusler et al. | |
| 2003/0048288 | A1 | 3/2003 | Drif et al. | |
| 2003/0058266 | A1 | 3/2003 | Dunlap et al. | |
| 2003/0064805 | A1 | 4/2003 | Wells | |
| 2003/0098876 | A1 * | 5/2003 | Makinen | 345/705 |
| 2003/0100964 | A1 * | 5/2003 | Kluge et al. | 700/83 |
| 2003/0101178 | A1 | 5/2003 | Miyata et al. | |
| 2003/0125057 | A1 | 7/2003 | Pesola | |
| 2003/0132854 | A1 | 7/2003 | Swan et al. | |
| 2003/0191820 | A1 * | 10/2003 | Ludtke | 709/219 |
| 2003/0222897 | A1 | 12/2003 | Moore et al. | |
| 2003/0227392 | A1 | 12/2003 | Ebert et al. | |
| 2004/0034651 | A1 | 2/2004 | Gupta et al. | |
| 2004/0088228 | A1 | 5/2004 | Mercer et al. | |
| 2004/0088696 | A1 | 5/2004 | Kawano et al. | |
| 2004/0090451 | A1 | 5/2004 | Lay et al. | |
| 2004/0093102 | A1 | 5/2004 | Liiri et al. | 700/96 |
| 2004/0095480 | A1 | 5/2004 | Battles et al. | |
| 2004/0103153 | A1 * | 5/2004 | Chang et al. | 709/206 |
| 2004/0107043 | A1 | 6/2004 | de Silva | |
| 2004/0107144 | A1 * | 6/2004 | Short | 705/26 |
| 2004/0111273 | A1 | 6/2004 | Sakagami et al. | |
| 2004/0117634 | A1 | 6/2004 | Letterer et al. | 713/182 |
| 2004/0121764 | A1 * | 6/2004 | Rivero | 455/418 |
| 2004/0136574 | A1 | 7/2004 | Kozakaya et al. | |
| 2004/0139180 | A1 * | 7/2004 | White et al. | 709/221 |
| 2004/0162896 | A1 | 8/2004 | Cen et al. | |
| 2004/0179545 | A1 | 9/2004 | Erola et al. | |
| 2004/0201867 | A1 * | 10/2004 | Katano | 358/1.15 |
| 2004/0242224 | A1 * | 12/2004 | Janik et al. | 455/426.1 |
| 2005/0055287 | A1 | 3/2005 | Schmidtberg et al. | |
| 2005/0060436 | A1 | 3/2005 | Kienhoefer | |
| 2005/0076302 | A1 | 4/2005 | Okamoto | |
| 2005/0080879 | A1 * | 4/2005 | Kim et al. | 709/219 |
| 2005/0154985 | A1 * | 7/2005 | Burkhart et al. | 715/705 |
| 2005/0160270 | A1 | 7/2005 | Goldberg et al. | |
| 2005/0219223 | A1 | 10/2005 | Kotzin et al. | |
| 2005/0228869 | A1 * | 10/2005 | Imago | 709/213 |
| 2005/0262062 | A1 * | 11/2005 | Xia | 707/3 |
| 2005/0268234 | A1 * | 12/2005 | Rossi et al. | 715/705 |
| 2006/0026304 | A1 | 2/2006 | Price | |
| 2006/0028428 | A1 | 2/2006 | Dai et al. | |
| 2006/0073815 | A1 * | 4/2006 | Pines et al. | 455/414.1 |
| 2006/0076398 | A1 | 4/2006 | Jung et al. | |
| 2006/0080188 | A1 | 4/2006 | Jung et al. | |
| 2006/0081695 | A1 | 4/2006 | Jung et al. | |
| 2006/0086781 | A1 | 4/2006 | Jung et al. | |
| 2006/0090132 | A1 | 4/2006 | Jung et al. | |
| 2006/0092033 | A1 * | 5/2006 | Hoff et al. | 340/679 |
| 2006/0100912 | A1 * | 5/2006 | Kumar et al. | 705/4 |
| 2006/0115802 | A1 | 6/2006 | Reynolds | |
| 2006/0116979 | A1 | 6/2006 | Jung et al. | |
| 2006/0117001 | A1 | 6/2006 | Jung et al. | |
| 2006/0157550 | A1 | 7/2006 | Jung et al. | |
| 2006/0173816 | A1 | 8/2006 | Jung et al. | |
| 2006/0190428 | A1 | 8/2006 | Jung et al. | |
| 2006/0206817 | A1 | 9/2006 | Jung et al. | |
| 2007/0005233 | A1 | 1/2007 | Pinkus et al. | |
| 2007/0027903 | A1 * | 2/2007 | Evans et al. | 707/102 |
| 2007/0033414 | A1 | 2/2007 | Dunko | |
| 2007/0038529 | A1 | 2/2007 | Jung et al. | |
| 2007/0040013 | A1 | 2/2007 | Jung et al. | |
| 2007/0064644 | A1 * | 3/2007 | Dowling et al. | 370/328 |

OTHER PUBLICATIONS

U.S. Appl. No. 11/524,025, Jung et al.

U.S. Appl. No. 11/069,893, Jung et al.

U.S. Appl. No. 11/061,387, Jung et al.

U.S. Appl. No. 11/041,861, Jung et al.

U.S. Appl. No. 11/037,828, Jung et al.

U.S. Appl. No. 11/037,827, Jung et al.

Alexander, Keith; Gilliam, Tig; Gramling, Kathy; Grubelic, Chris; Kleinberger, Herb; Leng, Stephen; Moogimane, Dhaval; Sheedy, Chris; "IBM Business Consulting Services—Applying Auto-ID to Reduce Losses Associated with Shrink"; Auto-ID Center Massachusetts Institute of Technology; bearing dates of Nov. 1, 2002, Feb. 1, 2003, Jun. 2002 and Nov. 2002; pp. 1-56; Auto-ID Center IBM-AUTOID-BC-003; located at: http://quintessenz.org/rfid.docs/www.autoidcenter.org/publishedresearch/ibm-autoid-bc-003.pdf; printed on Feb. 3, 2005.

"Capabilities"; Profit Logic; pp. 1-2; located at: http://www.profitlogic.com/capabilities.htm; printed on Feb. 3, 2005.

Emigh, Jacqueline; "IBM Unleashes New RFID Middleware"; eWeek Enterprise News & Reviews— Attention Health Care Technology Experts; bearing dates of Dec. 16, 2004 and 2005; pp. 1-2; located at: http://www.eweek.com/print_article2/0,2533,a=141068,00.asp; printed on Feb. 3, 2005.

"EPC RFID-based Inventory Management Solution Delivers Faster, Better Goods Logistics"; Solution Architects; bearing a date of 2003; pp. 1-15; located at: www.intel.com/business/bss/solutions/blueprints/pdf/30034101.pdf; printed on Jan. 10, 2005.

"Get real time warehouse management with Cadence WMS." ; Cadre Cadence Warehouse Management System Software; pp. 1; located at: http://www.cadretech.com/warehouse_mgmt.html; printed on Jan. 10, 2005.

"IBM RFID solution for asset tracking and inventory management"; pp. 1-3; located at: http://www-1.ibm.com/industries/wireless/doc/content/solution/1025230104.html; printed on Feb. 3, 2005.

"IBM RFID solution for asset tracking and inventory management"; pp. 1-3; located at: http://www-1.ibm.com/industries/wireless/doc/content/solution/1025230204.html; printed on Feb. 3, 2005.

Kuchinskas, Susan; "IBM in Major RFID Expansion"; Jupiterimages; Sep. 27, 2004; pp. 1-2; located at: http://www.internetnews.com/wireless/print.php/3412991; printed on Feb. 3, 2005.

Kuchinskas, Susan; "IBM Takes on Flood of RFID Data"; Jupiterimages; Jul. 19, 2004; pp. 1-3; located at: http://www.internetnews.com/ent-news/print.php/3382621; printed on Feb. 3, 2005.

"Nordstrom: Inventory Management Transformation"; Accenture.com; bearing a date of 1995-2005; pp. 1-2; located at: http://www.accenture.com/xd/xd.asp?it=enweb&xd=industries%5Cproducts%5Cretail%5Ccase%5Creta_nordstrom.xml; printed on Feb. 3, 2005.

"Solutions"; Profit Logic; pp. 1-2; located at: http://www.profitlogic.com/solutions.htm; printed on Feb. 3, 2005.

The EPCglobal Network™: Overview of Design, Benefits, & Security; EPCglobal Inc.; Sep. 24, 2004; pp. 1-11; located at: http://www.epcglobalinc.org/news/position_papers.html; printed on Feb. 3, 2005.

U.S. Appl. No. 12/012,216, Jung, et al.

Heywood, Drew; "Drew Heywood's Windows 2000 Network Services"; bearing a date of Feb. 28, 2001; pp. 1-17; Sam's; located at http://proquest.safaribooksonline.com/print?xmlid=0672317419/ch01lev1sec4; printed on Mar. 13, 2008.

Excerpt from the Cambridge Dictionary Online; bearing a date of 2009; printed on Oct. 23, 2009; pp. 1-2; Cambridge University Press; located at http://dictionary.cambridge.org//define.asp?key=62453&diet=CALD.

* cited by examiner

FIG. 26

870

872 A computer-readable medium.

874 A computer program product encoding a computer program for executing on a computer system a computer process, the computer process comprising:

a) receiving an input corresponding to a user-selected item from a plurality of items, each item of the plurality of items having a prior presence within a geographic locale; and b) searching a plurality of end user assistances respectively corresponding to the plurality of items for an end user assistance correlating with the user-selected item, each end user assistance of the plurality of end user assistances respectively having been obtained in response to the prior presence within a geographic locale of the corresponding item.

876 c) providing the end user assistance correlating with the user-selected item.

OBTAINING USER ASSISTANCE

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the herein listed application(s); the present application also claims the earliest available effective filing date(s) from, and also incorporates by reference in its entirety all subject matter of any and all parent, grandparent, great-grandparent, etc. applications of the herein listed application(s). The United States Patent Office (USPTO) has published a notice to the effect that the USPTO's computer programs require that patent applicants reference both a serial number and indicate whether an application is a continuation or continuation in part. The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

1. For purposes of the USPTO extra-statutory requirements, the present application constitutes a continuation in part of currently co-pending U.S. patent application entitled PROVIDING ASSISTANCE, naming Edward K. Y. Jung, Royce A. Levien, Mark A. Malamud, and John D. Rinaldo, Jr., as inventors, filed Sep. 30, 2004, Ser. No. 10/955,966.

2. For purposes of the USPTO extra-statutory requirements, the present application constitutes a continuation in part of currently co-pending U.S. patent application entitled ENHANCED USER ASSISTANCE, naming Edward K. Y. Jung, Royce A. Levien, Mark A. Malamud, and John D. Rinaldo, Jr., as inventors, filed Oct. 26, 2004, Ser. No. 10/974,476.

3. For purposes of the USPTO extra-statutory requirements, the present application constitutes a continuation in part of currently co-pending U.S. patent application entitled ENHANCED USER ASSISTANCE, naming Edward K. Y. Jung, Royce A. Levien, Mark A. Malamud, and John D. Rinaldo, Jr., as inventors, filed Oct. 26, 2004, Ser. No. 10/974,555.

4. For purposes of the USPTO extra-statutory requirements, the present application constitutes a continuation in part of currently co-pending U.S. patent application entitled ENHANCED CONTEXTUAL USER ASSISTANCE, naming Edward K. Y. Jung, Royce A. Levien, Mark A. Malamud, and John D. Rinaldo, Jr., as inventors, filed Oct. 27, 2004, Ser. No. 10/974,561.

5. For purposes of the USPTO extra-statutory requirements, the present application constitutes a continuation in part of currently co-pending U.S. patent application entitled ENHANCED USER ASSISTANCE, naming Edward K. Y. Jung, Royce A. Levien, Mark A. Malamud, and John D. Rinaldo, Jr., as inventors, filed Oct. 29, 2004, Ser. No. 10/978,243.

6. For purposes of the USPTO extra-statutory requirements, the present application constitutes a continuation in part of currently co-pending U.S. patent application entitled ENHANCED USER ASSISTANCE, naming Edward K. Y. Jung, Royce A. Levien, Mark A. Malamud, and John D. Rinaldo, Jr., as inventors, filed Dec. 1, 2004, Ser. No. 11/000,687.

7. For purposes of the USPTO extra-statutory requirements, the present application constitutes a continuation in part of currently co-pending U.S. patent application entitled ENHANCED USER ASSISTANCE, naming Edward K. Y. Jung, Royce A. Levien, Mark A. Malamud, and John D. Rinaldo, Jr., as inventors, filed Dec. 1, 2004, Ser. No. 11/000,736.

8. For purposes of the USPTO extra-statutory requirements, the present application constitutes a continuation in part of currently co-pending U.S. patent application entitled OBTAINING USER ASSISTANCE, naming Edward K. Y. Jung, Royce A. Levien, Mark A. Malamud, and John D. Rinaldo, Jr., as inventors, filed Jan. 18, 2005, Ser. No. 11/037,828.

9. For purposes of the USPTO extra-statutory requirements, the present application constitutes a continuation in part of currently co-pending U.S. patent application entitled OBTAINING USER ASSISTANCE, naming Edward K. Y. Jung, Royce A. Levien, Mark A. Malamud, and John D. Rinaldo, Jr., as inventors, filed Jan. 18, 2005, Ser. No. 11/037,827.

The above applications are specifically incorporated herein by reference in their entirety for all that they disclose and teach. In an event of any conflict between the instant application and an application incorporated by reference, the instant application controls.

SUMMARY

An embodiment provides a method. The method includes receiving an input corresponding to a user-selected item from a plurality of items, each item of the plurality of items respectively having a prior presence within a geographic locale. The method also includes searching a plurality of end user assistances respectively corresponding to the plurality of items for an end user assistance correlating with the user-selected item. Each end user assistance of the plurality of end user assistances respectively having been obtained in response to the prior presence within a geographic locale of the corresponding item. The method may further include providing the end user assistance correlating with the user selected item. In addition to the foregoing, other method embodiments are described in the claims, drawings, and text forming a part of the present application.

Another embodiment provides a computer program product. The computer program product encodes a computer program for executing on a computer system a computer process. The computer process includes receiving an input corresponding to a user-selected item from a plurality of items, each item of the plurality of items respectively having a prior presence within a geographic locale. The computer process further includes searching a plurality of end user assistances respectively corresponding to the plurality of items for an end user assistance correlating with the user-selected item. Each end user assistance of the plurality of end user assistances respectively having been obtained in response to the prior presence within a geographic locale of the corresponding item. The computer process may include providing the end user assistance correlating with the user-selected item. In addition to the foregoing, other computer program product embodiments are described in the claims, drawings, and text forming a part of the present application.

A further embodiment provides a system. The system includes a computing device and instructions. The instructions when executed on the computing device cause the computing device to receive an input corresponding to a user-selected item from a plurality of items. Each item of the plurality of items respectively having a prior presence within a geographic locale. The instructions further cause the computing device to search a plurality of end user assistances respectively corresponding to the plurality of items for an end user assistance correlating with the user-selected item. Each end user assistance of the plurality of end user assistances respectively having been obtained in response to the prior presence within a geographic locale of the corresponding item. Instructions may further cause the computing device to provide the end user assistance correlating with the user-selected item. In addition to the foregoing, other system embodiments are described in the claims, drawings, and text forming a part of the present application.

An embodiment provides a method. The method includes saving a plurality of end user assistances respectively corresponding to a plurality of items each having at least one aspect. Each end user assistance of the plurality of end user assistances respectively having been obtained in response to an identification of each corresponding item of the plurality of items during a presence within a geographic locale of the corresponding item. The method further includes receiving an input corresponding to a user-selected aspect of an item of the plurality of items, and searching the saved plurality of end user assistances for an end user assistance correlating to the user-selected aspect of an item. The identification of each corresponding item may include an automatic identification of each corresponding item. The automatic identification of each corresponding item of the plurality of items may include generating a signal indicative of the corresponding item in response to a presence of the corresponding item within the geographic locale, and identifying the corresponding item in response to the signal indicative of the corresponding item. The method may further include providing the end user assistance correlating with the user-selected aspect of an item. In addition to the foregoing, other method embodiments are described in the claims, drawings, and text forming a part of the present application.

Another embodiment provides a computer program product. The computer program product encodes a computer program for executing a computer process on a computer system. The computer process includes saving a plurality of end user assistances respectively corresponding to a plurality of items each having at least one aspect. Each end user assistance of the plurality of end user assistances respectively having been obtained in response to an automatic identification of each corresponding item of the plurality of items during a presence of the corresponding item within a geographic locale. The computer process also includes receiving an input corresponding to a user-selected aspect of an item of the plurality of items, and searching the saved plurality of end user assistances for an end user assistance correlating to the user-selected aspect of an item. The computer program product may further include providing the end user assistance correlating to the user-selected aspect of the item. In addition to the foregoing, other computer program product embodiments are described in the claims, drawings, and text forming a part of the present application.

A further embodiment provides a system. The system includes a computing device having a storage medium, and instructions. The instructions when run on the computing device cause the computing device to save a plurality of end user assistances respectively corresponding to a plurality of items each having at least one aspect. Each end user assistance of the plurality of end user assistances respectively having been obtained in response to an automatic identification of each corresponding item of the plurality of items during a presence of the corresponding item within a geographic locale. The instructions further cause the computing device to receive an input corresponding to a user-selected aspect of an item of the plurality of items, and to search the saved plurality of end user assistances for an end user assistance correlating to the user-selected aspect of an item. In addition to the foregoing, other system embodiments are described in the claims, drawings, and text forming a part of the present application.

An embodiment provides a system. The system includes a storage module operable to save a plurality of end user assistances respectively corresponding to a plurality of items each having at least one aspect. Each end user assistance of the plurality of end user assistances respectively having been obtained in response to an automatic identification of each corresponding item of the plurality of items during a presence of the corresponding item within a geographic locale. The system includes a user interaction module operable to receive an input corresponding to a user-selected aspect of an item of the plurality of items. The system further includes a locator module operable to search the saved plurality of end user assistances for an end user assistance correlating to the user-selected aspect of an item. In addition to the foregoing, other system embodiments are described in the claims, drawings, and text forming a part of the present application.

Another embodiment provides a method. The method includes providing an input-selection to a user interface associated with a computing device, the provided input-selection corresponding to an aspect of an item of a plurality of items. Each item of the plurality of items respectively having a prior presence within a geographic locale. The method includes waiting while the computing device searches a plurality of end user assistances respectively corresponding to the plurality of items for an end user assistance correlating with the user-selected aspect of an item. Each end user assistance of the plurality of user assistances respectively having been obtained in response to the prior presence within a geographic locale by the corresponding item. The method further includes receiving an end user assistance correlating to the input-selection. In addition to the foregoing, other method embodiments are described in the claims, drawings, and text forming a part of the present application.

A further embodiment provides a method. The method includes receiving an input corresponding to a user-selected item from a plurality of items, each item of the plurality of items respectively having a prior presence within a geographic locale. The method also includes searching a plurality of user assistances respectively corresponding to the plurality of items for a user assistance correlating with the user-selected item. Each user assistance of the plurality of user assistances respectively having been obtained in response to the prior presence within a geographic locale of the corresponding item. The method may further include providing the user assistance correlating with the user selected item. In addition to the foregoing, other method embodiments are described in the claims, drawings, and text forming a part of the present application.

In addition to the foregoing, various other embodiments are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein.

BRIEF DESCRIPTION OF THE DRAWINGS

FIG. 26 illustrates a partial view of an exemplary computer program product that includes a computer program for executing a computer process on a computing device;

DETAILED DESCRIPTION

In the following detailed description of exemplary embodiments, reference is made to the accompanying drawings, which form a part hereof. In the several figures, like referenced numerals identify like elements. The detailed description and the drawings illustrate exemplary embodiments. Other embodiments may be utilized, and other changes may be made, without departing from the spirit or scope of the subject matter presented here. The following detailed description is therefore not to be taken in a limiting sense, and the scope of the claimed subject matter is defined by the appended claims.

Features, functionality, and options of computing devices, such as personal computers, have rapidly advanced and evolved as technology provides increased processor speed, storage capacity, and connectivity. Computing technology has moved beyond the personal computer and into everyday items and devices, providing embedded technology and connectivity. Almost any thing or item, from buildings to clothing, from telephones to tools, from appliances to cars, from homes to the human body, from personal information devices to a common a coffee mug, may have an embedded electronic device that includes a computing device. The embedded electronic device typically improves performance and capacity of a basic functionality of the item, and may connect the item with a network of other items or the Internet. These items with embedded electronic devices may be described using a variety of names, which may not have a bright line distinction between them. Commonly used names include a limited resource-computing device, limited capacity computing device, ubiquitous computing device, pervasive computing device, digital appliance, and Internet appliance. Additionally, rapid advances have been made in interconnectability and interoperability of computing devices and other devices at a consumer level, such as handheld devices and cell phones, and at system and a large system level. These advances are intended to provide a user with many benefits.

Realization of these benefits may require that a user read and re-read manuals for their items. However, a user may experience difficulty obtaining, maintaining, updating, and simply keeping track of all the manuals for the items present and/or used in and around their premises, such as their home and/or business premises. Additionally, manuals are sometimes lost, misplaced, or unavailable. A user may benefit from a method, system, and computer program product that automatically identifies and obtains manuals for items having a presence within a user's geographic locale, such as their home and or/business. A user may also benefit by being able to search the obtained manuals for an assistance related to a selected item of the items having a presence within the geographic locale.

Figure 1:
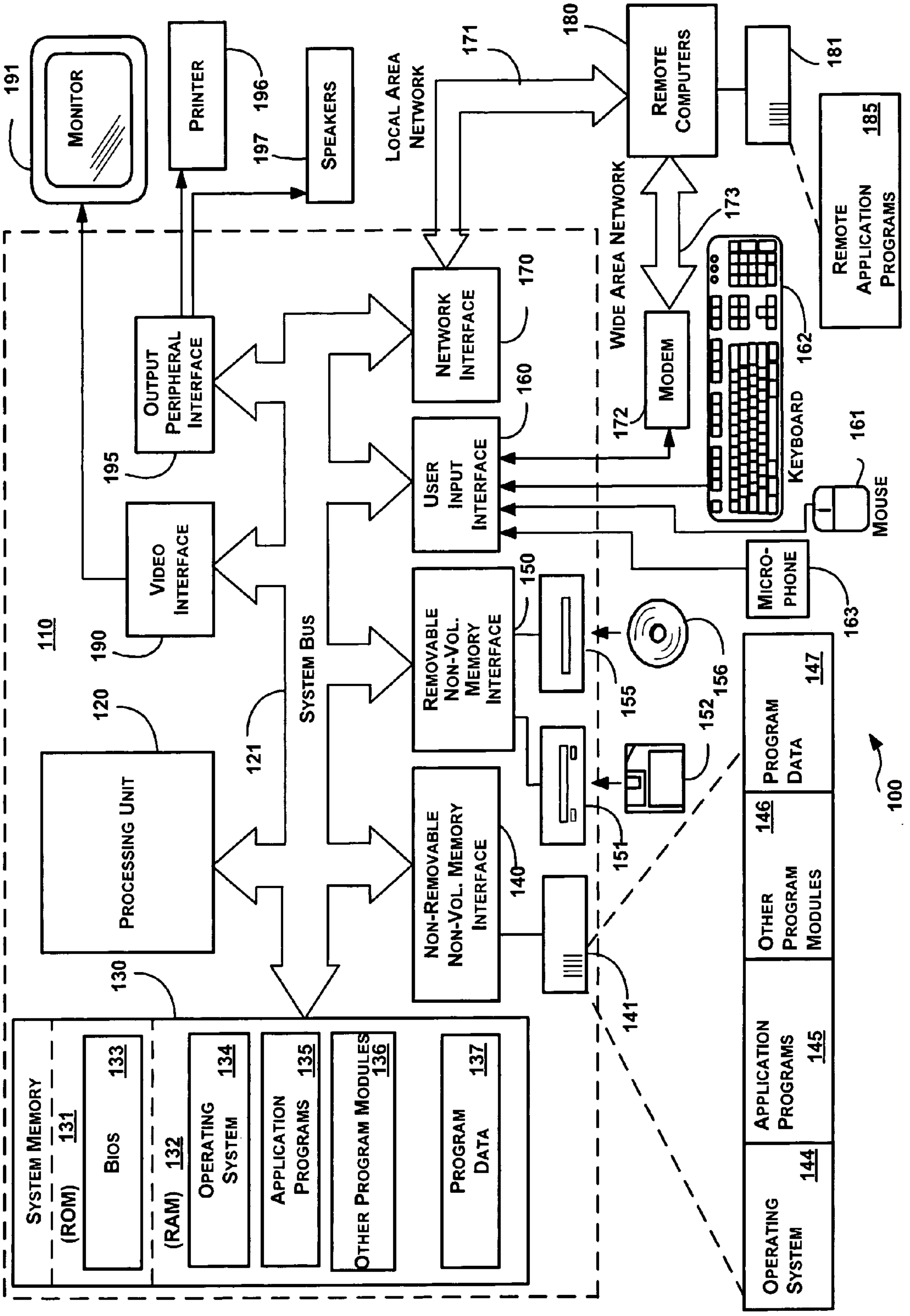
FIG. 1 illustrates an exemplary system in which embodiments may be implemented, including a general-purpose computing device.

FIG. 1 and the following discussion are intended to provide a brief, general description of an environment in which embodiments may be implemented. FIG. 1 illustrates an exemplary electronic device that may correspond in whole or part to a general-purpose computing device, and is shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media. Computer storage media includes both volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media. Combinations of the any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 1 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computing device 110 may also include other removable/non-removable, volatile/nonvolatile computer storage media products. By way of example only, FIG. 1 illustrates a non-removable non-volatile memory interface (hard disk interface) 140 that reads from and writes to non-removable, non-volatile magnetic media, a magnetic disk drive 151 that reads from and writes to a removable, non-volatile magnetic disk 152, and an optical disk drive 155 that reads from and writes to a removable, non-volatile optical disk 156 such as a CD ROM. Other removable/nonremovable, volatile/non-volatile computer storage media that can be used in the exemplary operating environment include, but are not limited to, magnetic tape cassettes, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 1 provide storage of computer-readable instructions, data structures, program modules, and other data for the computing device 110. In FIG. 1, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 1. The logical connections depicted in FIG. 1 include a local area network (LAN) 171 and a wide area network (WAN) 173, but may also include other networks such as a personal area network (PAN) (not shown). Such networking environments are commonplace in offices, enterprise-wide computer networks, intranets, and the Internet.

When used in a LAN networking environment, the computing system environment 100 is connected to the LAN 171 through a network interface or adapter 170. When used in a WAN networking environment, the computing device 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computing device 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, certain embodiments may be described with reference to acts and symbolic representations of operations that are performed by one or more computing devices, such a computing device 110 of FIG. 1. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

FIG. 1 illustrates an example of a suitable environment on which embodiments may be implemented. The computing system environment 100 of FIG. 1 is an example of a suitable environment and is not intended to suggest any limitation as to the scope of use or functionality of an embodiment. Neither should the environment be interpreted as having any dependency or requirement relating to any one or combination of components illustrated in an exemplary operating environment.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, server computers, hand-held or laptop devices, personal digital assistants, multiprocessor systems, microprocessor-based systems, set top boxes, programmable consumer electronics, network, minicomputers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in distributed computing environments where tasks are performed by remote processing devices that are linked through a communications network. In a distributed computing environment, program modules may be located in both local and remote computer storage media including memory storage devices.

The following include a series of illustrations depicting implementations of processes. For ease of understanding, certain illustrations are organized such that the initial illustrations present implementations via an overall "big picture" viewpoint and thereafter the following illustrations present alternate implementations and/or expansions of the "big picture" illustrations as either sub-steps or additional steps building on one or more earlier-presented illustrations. This style of presentation utilized herein (e.g., beginning with a presentation of a illustration(s) presenting an overall view and thereafter providing additions to and/or further details in subsequent illustrations) generally allows for a rapid and easy understanding of the various process implementations.

Figure 2:
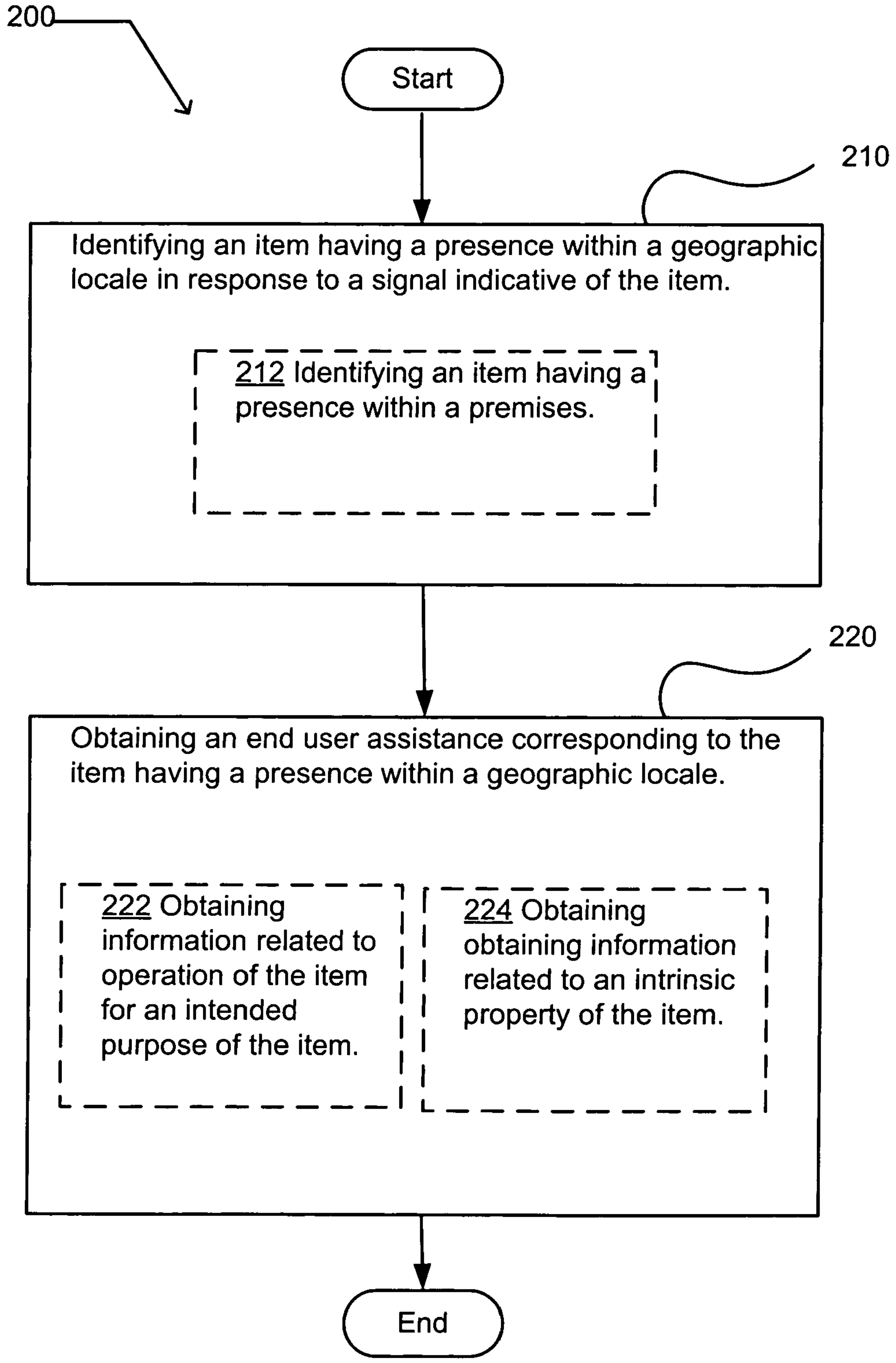
FIG. 2 illustrates an operational flow representing exemplary operations that obtain an assistance corresponding to an item having a presence within a geographic locale.

FIG. 2 illustrates an operational flow 200 representing exemplary operations that obtain an assistance corresponding to an item having a presence within a geographic locale. After a start operation, the operational flow 200 moves to a recognition operation 210 where an item having a presence within a geographic locale is identified in response to a signal indicative of the item. At help operation 220, an end user assistance is obtained corresponding to the item having a presence within a geographic locale. In an embodiment, an end user includes one for whom the item is designed and/or produced, as opposed to those involved creating, manufacturing, transporting, promoting, and/or marketing the item. An end user may include a person, an entity, and/or a government. In another embodiment, an end user includes a consumer of the item. In a further embodiment, an end user assistance may include any type of assistance for an end user. For example, an end user assistance may include an assistance for use by a user, and/or an assistance in operation of the item. In another embodiment, an end user assistance for use by the item may include, for example, an upgrade to a firmware or program present in the item, and responding to a recall notice. A response to a recall notice may include, for example, ordering a replacement part in response to the recall notice.

In an alternative embodiment, the recognition operation 210 may include the operation 212, wherein an item having a presence within a premises is identified in response to a signal indicative of the item. In a further alternative embodiment, the help operation 220 may include the operation 222, wherein information is obtained related to operation of the item for an intended purpose of the item. An alternative embodiment of the help operation 220 may include the operation 224, wherein information is obtained related to an intrinsic property of the item having a presence within a geographic locale. The operational flow 200 then moves to an end operation.

As used herein, in an embodiment, an item may include any object or device capable of having any type of identifiable presence within a geographic locale. For example and without limitation, in certain embodiments an item may include one or more of the following: an electronic device; an appliance; a computing device, such as a personal computer and a server; a limited resource computing device; a pervasive computing device; PDA; a cell phone; a Blackberry appliance; a vehicle, such as a car, boat, and/or aircraft; an X-Box; a home gateway; a set-top box; a point-of-sale terminal; a camera; a TiVo; and an automated teller machine. In other embodiments, an item may be incorporated within another item. In other embodiments, an item may not include a computing device.

Figure 3:
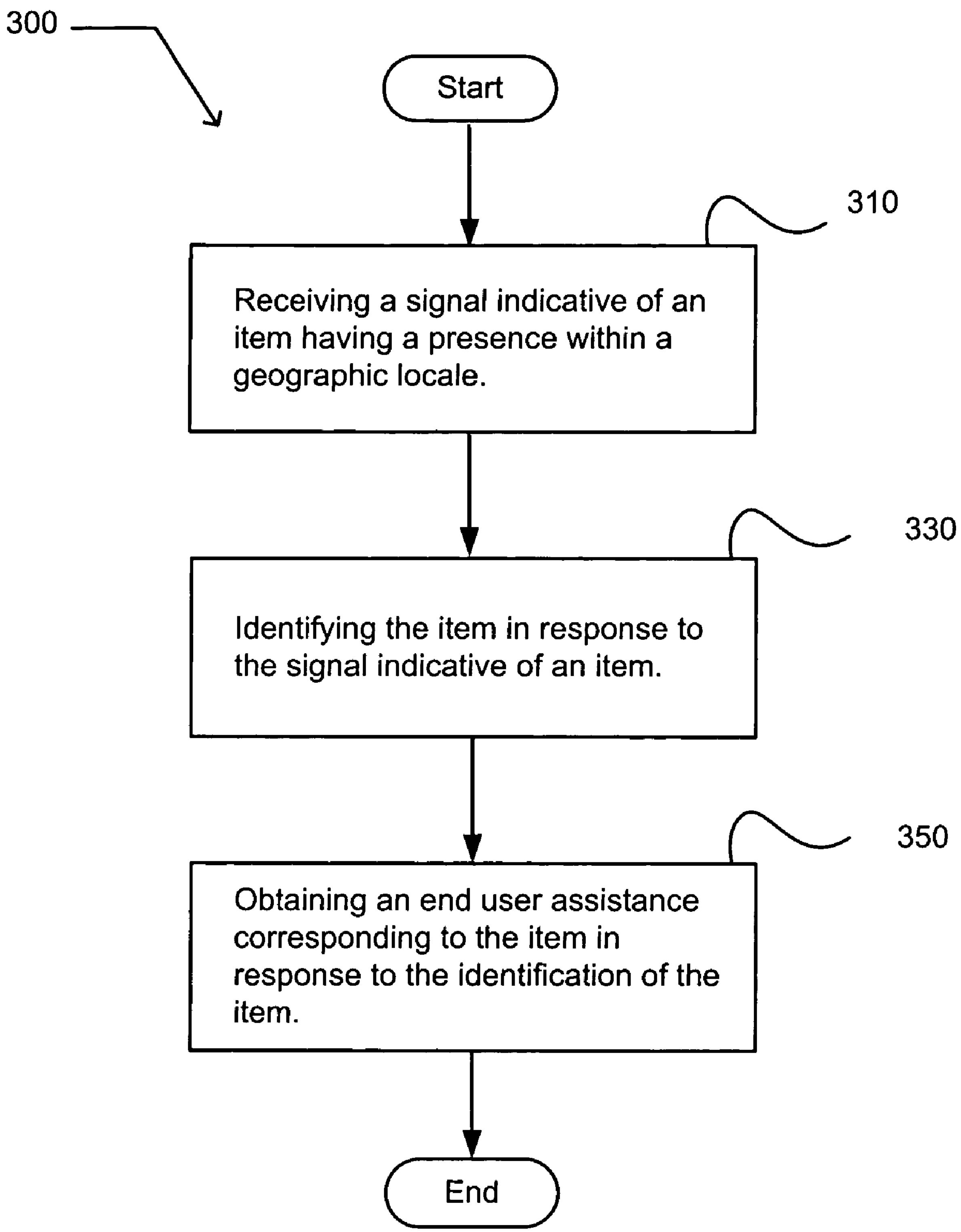
FIG. 3 illustrates another operational flow representing exemplary operations that obtain an assistance corresponding to an item having presence within a geographic locale.

FIG. 3 illustrates an operational flow 300 representing exemplary operations that obtain an assistance corresponding to an item having presence within a geographic locale. After a start operation, the operational flow 300 moves to a reception operation 310. At the operation 310, a signal indicative of an item having a presence within a geographic locale is received. At a recognition operation 330, the item having a presence within a geographic locale is identified in response to the signal indicative of an item. At a help operation 350, an end user assistance is obtained corresponding to the item having a presence within a geographic locale in response to the identification of the item. The operational flow 300 then moves to an end operation.

Figure 4:
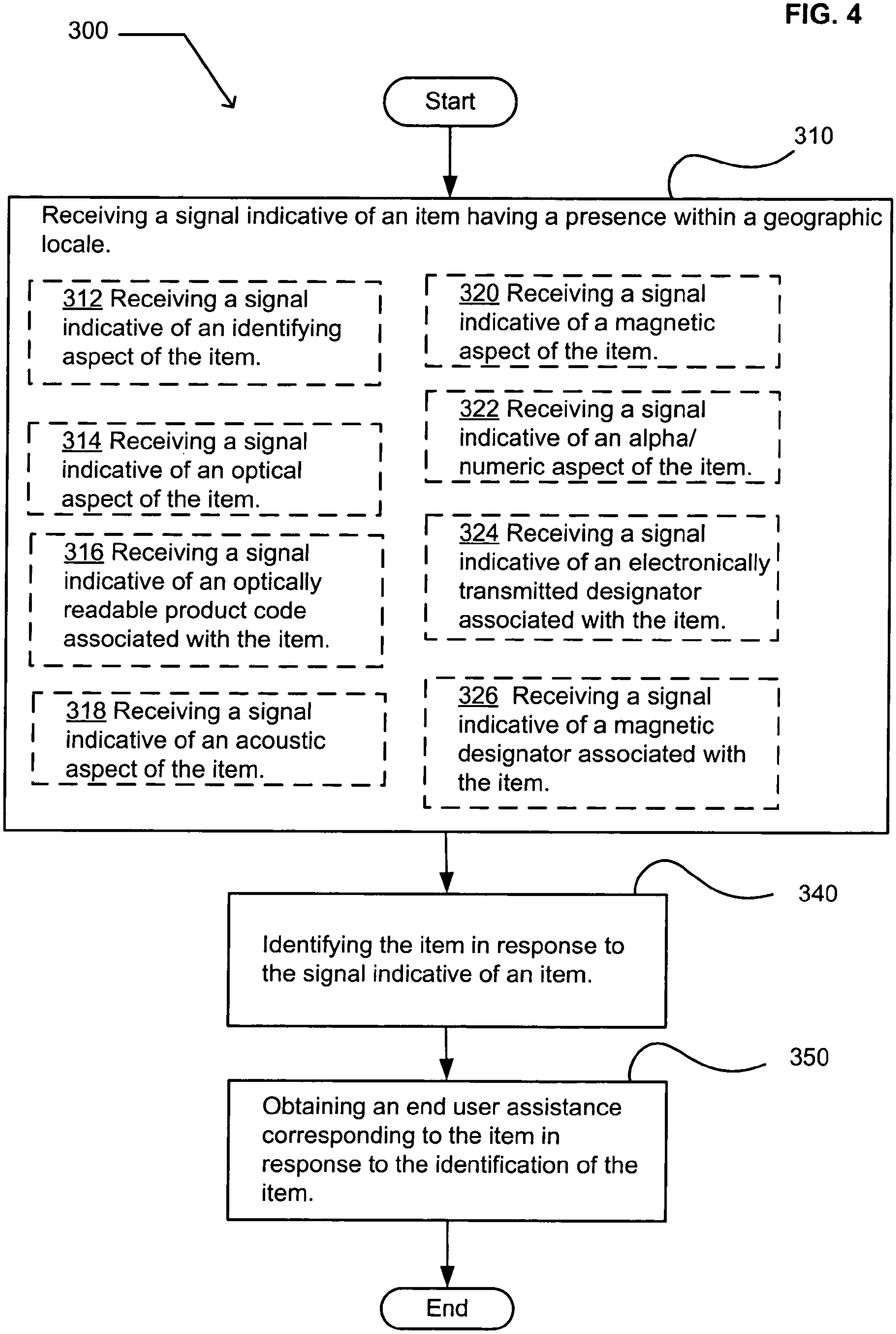
FIG. 4 illustrates an alternative embodiment of the exemplary operational flow of FIG. 3.

FIG. 4 illustrates an alternative embodiment of the exemplary operational flow 300 of FIG. 2. FIG. 4 illustrates an embodiment where the reception operation 310 may include at least one additional operation. Additional operations may include operation 312, operation 314, operation 316, operation 318, operation 320, operation 322, operation 324, and operation 326. At the operation 312, a signal indicative of an identifying aspect of the item is received. An identifying aspect of the item may include any aspect or aspects useful in identifying the item. For example, an identifying aspect of an item may include a profile, a shape, or other of distinguishable aspect of the item. In addition and without limitation, an identifying aspect of the item may include a visual signature the item, an acoustic signature the item, an electromagnetic signature of the item, and/or a magnetic signature of the item. At the operation 314, a signal indicative of an optical aspect of the item is received. An optical aspect of the item may include any optical aspect or aspects useful in identifying the item. For example, an optical aspect may include a known shape, for example a robot, a ship, and a car. At the operation 316, a signal indicative of an optically readable product code associated with the item is received. An optically readable product code associated with the item may include any optically readable product code useful in identifying the item. For example, an optically readable product code may include a bar code reflecting a vehicle identification number, and/or a SKU number.

At the operation 318, a signal indicative of an acoustic aspect of the item is received. An acoustic aspect of the item may include any acoustic aspect or aspects useful identifying the item. For example, an acoustic aspect may include a sound of a motorcycle, such as a Harley Davidson motorcycle. At the operation 320, a signal indicative of a magnetic aspect of the item is received. A magnetic aspect of the item may include a presence or absence of a magnetic characteristic of the item. At the operation 322, a signal indicative of an alpha/numeric aspect of the item is received. An alpha/numeric aspect of the item may include any alpha/numeric aspect useful in identifying the item. For example, an alpha/numeric aspect may include a trademark, such as "Ford" on a vehicle, "Dell" on a computing device. An alpha/numeric aspect may include a model number, and publicly viewable characters on a license plate or an aircraft registration number. At the operation 324, a signal indicative of an electronically transmitted designator associated with the item is received. The electronically transmitted designator may include any designator useful in identifying the item, such as a signal transmitted by an RFID device. At operation 326, a signal indicative of a magnetic designator associated with the item is received. The magnetic designator associated with the item may be any magnetic designator useful identifying the item, such as a scannable magnetic strip incorporated into a card or the item.

Figure 5:
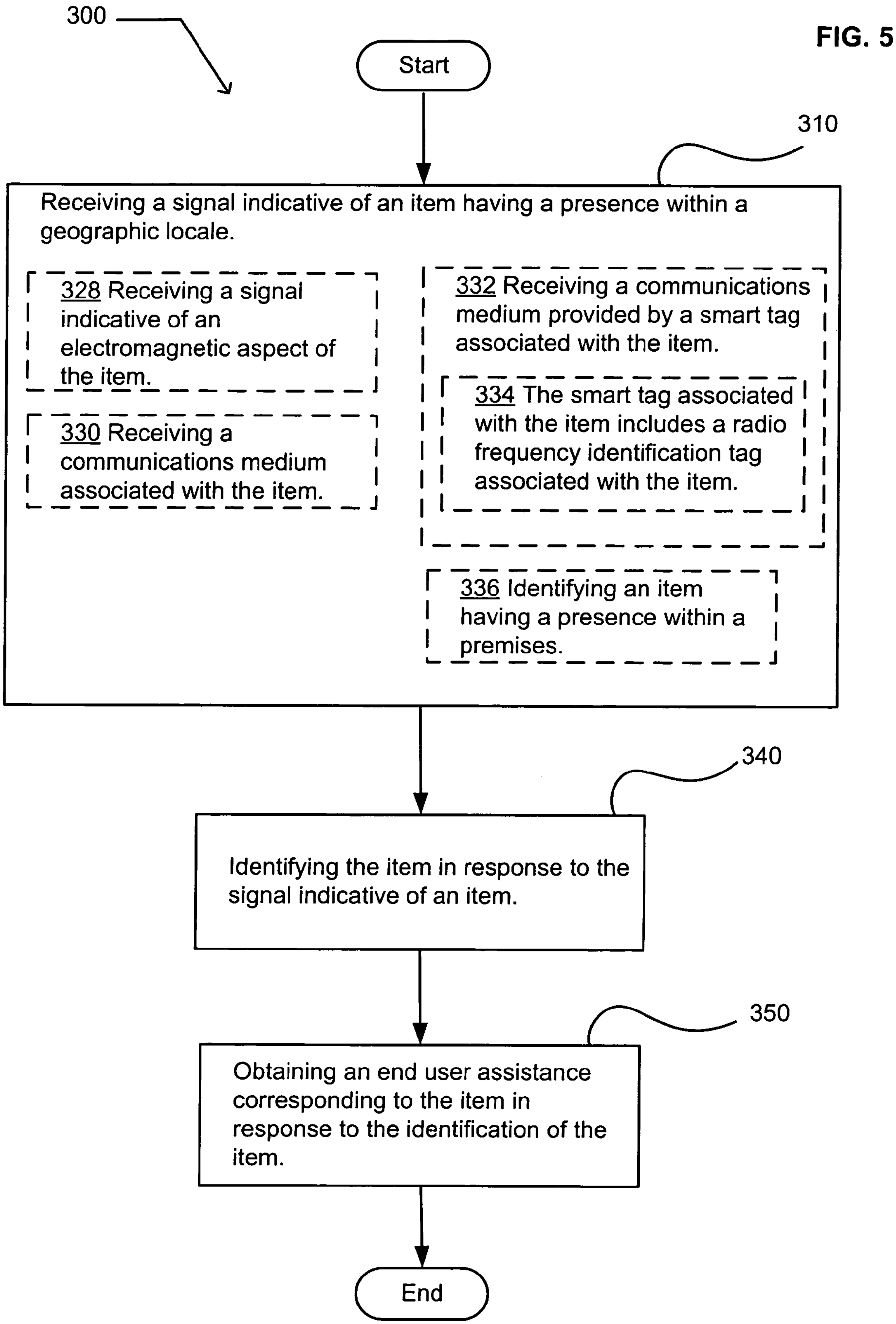
FIG. 5 illustrates another alternative embodiment of the exemplary operational flow of FIG. 3.

FIG. 5 illustrates an alternative embodiment of the exemplary operational flow 300 of FIG. 2. FIG. 5 illustrates an embodiment where the reception operation 310 may include at least one additional operation. The additional operations may include operation 328, operation 330, operation 332, operation 334, and operation 336. At operation 328, a signal indicative of an electromagnetic aspect of the item is received. The electromagnetic aspect may be any aspect of the item useful in identifying the item, such as an electromagnetic signature of the item. At operation 330, a communications medium associated the item is received. The communications medium associated with or associatable with the item may be any communications medium associatable and useful in identifying the item. At operation 332, a communications medium provided by a smart tag associated with the item is received. In a further alternative embodiment, the operation 332 may include operation 334 wherein the smart tag associated with the item includes a radio frequency identification tag associated with the item the identifying an item having a presence within a geographic locale includes identifying an item having a presence within a premises.

Figure 6:
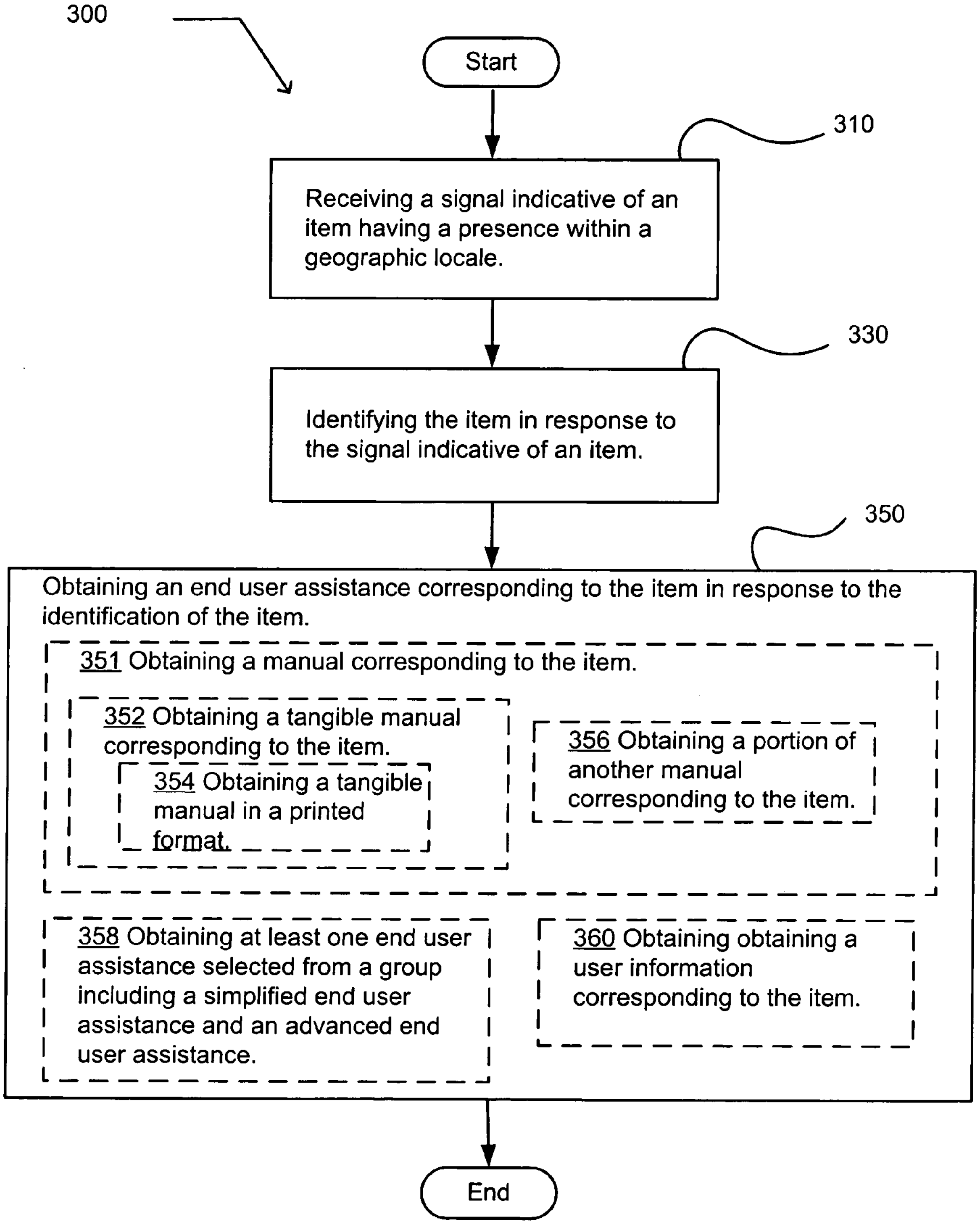
FIG. 6 illustrates a further alternative embodiment of the exemplary operational flow of FIG. 3.

FIG. 6 illustrates an alternative embodiment of the exemplary operational flow 300 of FIG. 2. FIG. 6 illustrates an embodiment where the reception operation 350 may include at least one additional operation. Additional operations may include operation 351, operation 358, and operation 360. At operation 351, a manual corresponding to the item is obtained. Operation 351 may include additional operations, such as operation 352, and operation 356. At operation 352, a tangible manual corresponding to the item is obtained. Operation 352 may include an additional operation 354, wherein a tangible manual in a printed format is obtained. In other alternative embodiments, operation 351 may include obtaining an intangible manual, and the intangible manual may include a manual having a digital format. At operation 356, the obtaining a manual may include a portion of another manual corresponding to the item. At operation 358, at least one end user assistance is obtained by selecting from a group including a simplified user assistance and an advanced user assistance. At operation 360, the obtaining an end user assistance corresponding to the item includes obtaining a user information corresponding to the item.

Figure 7:
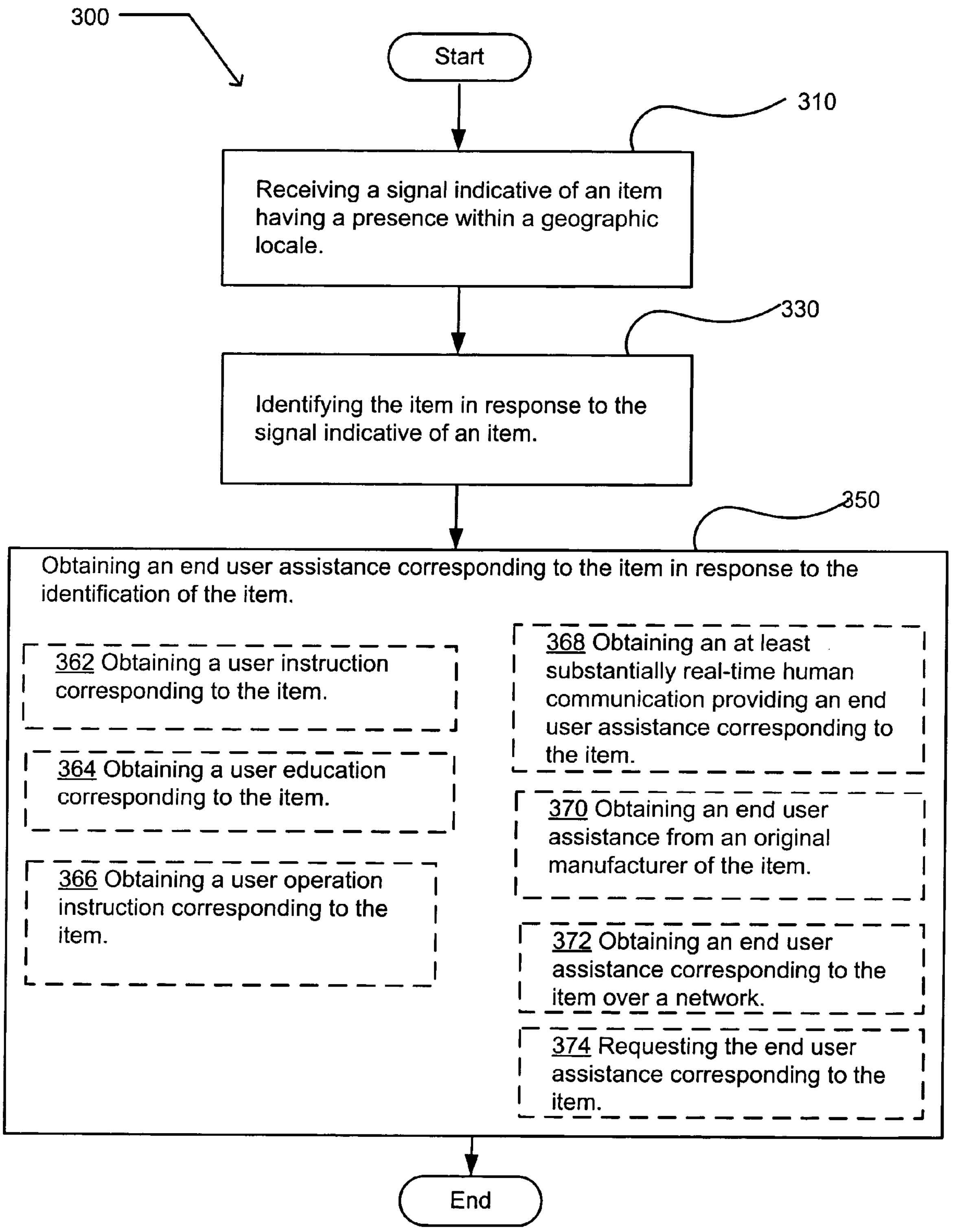
FIG. 7 illustrates yet another alternative embodiment of the exemplary operational flow of FIG. 3.

FIG. 7 illustrates an alternative embodiment of the exemplary operational flow 300 of FIG. 2. FIG. 7 illustrates an embodiment where the reception operation 350 may include at least one additional operation. Additional operations may include operation 362, operation 364, operation 366, operation 368, operation 370, operation 372, and operation 374. At operation 362, a user instruction corresponding to the item is obtained. At operation 364, a user education corresponding to the item is obtained. At operation 366, a user operation instruction corresponding to the item is obtained. At operation 368, an at least substantially real-time human communication is obtained a providing an end user assistance corresponding to the item. At operation 370, an end user assistance is obtained from an original manufacturer of the item. At operation 372, an end user assistance corresponding to the item is delivered over a network. In another alternative embodiment, an end user assistance corresponding to the item is delivered by a mail service, such as the U.S. Post Office or a private mail service. At operation 374, the obtaining an end user assistance corresponding to the item includes requesting the end user assistance corresponding to the item.

Figure 8:
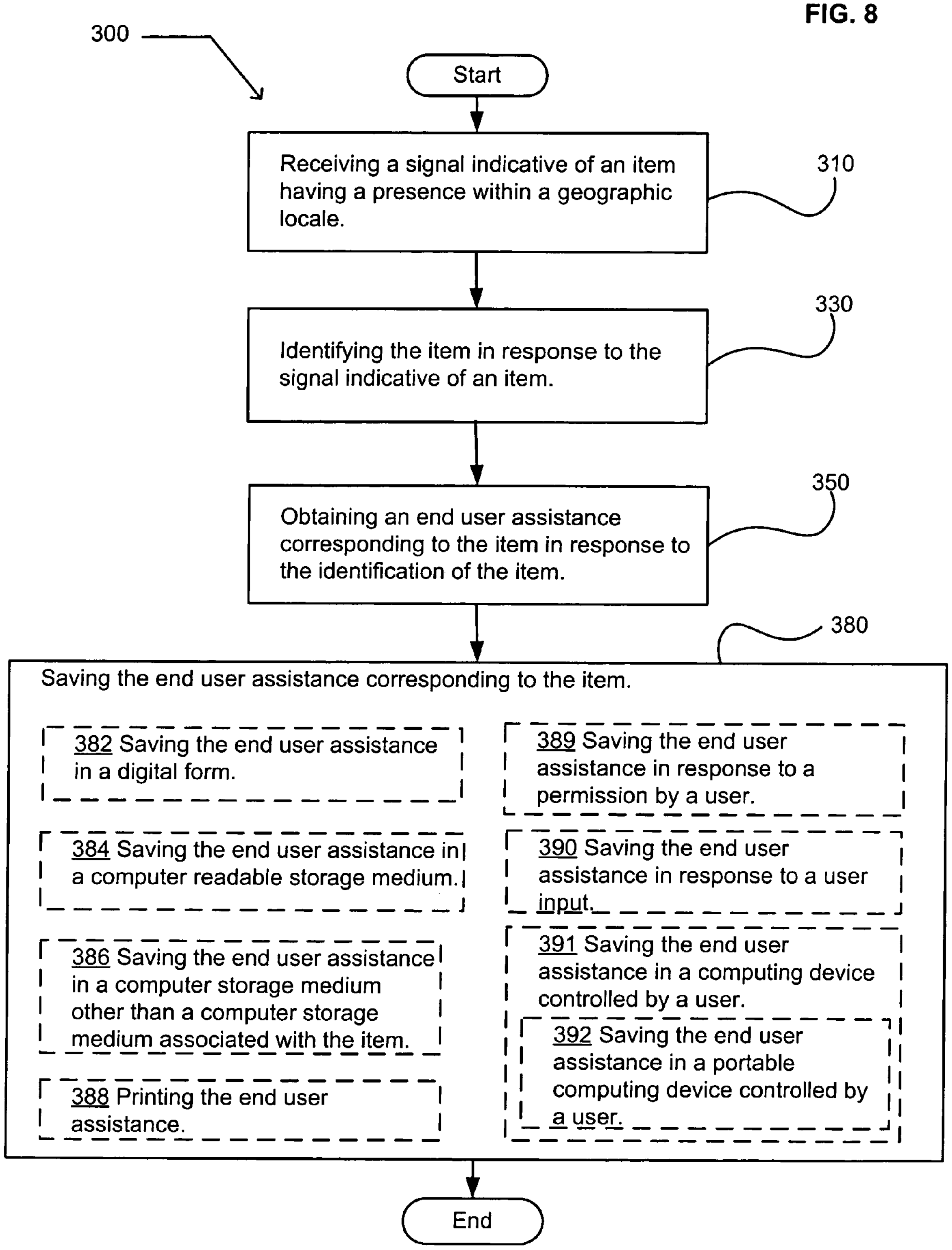
FIG. 8 illustrates an alternative embodiment of the exemplary operational flow of FIG. 3 that includes a retention operation.

FIG. 8 illustrates an alternative embodiment of the exemplary operational flow 300 of FIG. 2 that includes a retention operation 380. At operation 380, the end user assistance corresponding to the item is saved. An alternative embodiment of the operation 380 may include at least one additional operation. Additional operations may include operation 382, operation 384, operation 386, operation 388, operation 389, operation 390, an operation 391. At the operation 382, the end user assistance is saved in a digital form. At operation 384, the end user assistance is saved on a computer readable storage medium. At operation 386, the end user assistance is saved on a computer storage medium other than a computer storage medium associated with the item. At operation 388, the end user assistance is printed. At operation 389, the end user assistance is saved in response to a permission by a user. At operation 390, the end user assistance is saved in response to a user input. At operation 391, the end user assistance is saved in a computing device controlled by a user. An alternative embodiment of the operation 391 includes operation 392, wherein the end user assistance is saved in a portable computing device controlled by the user.

Figure 9:
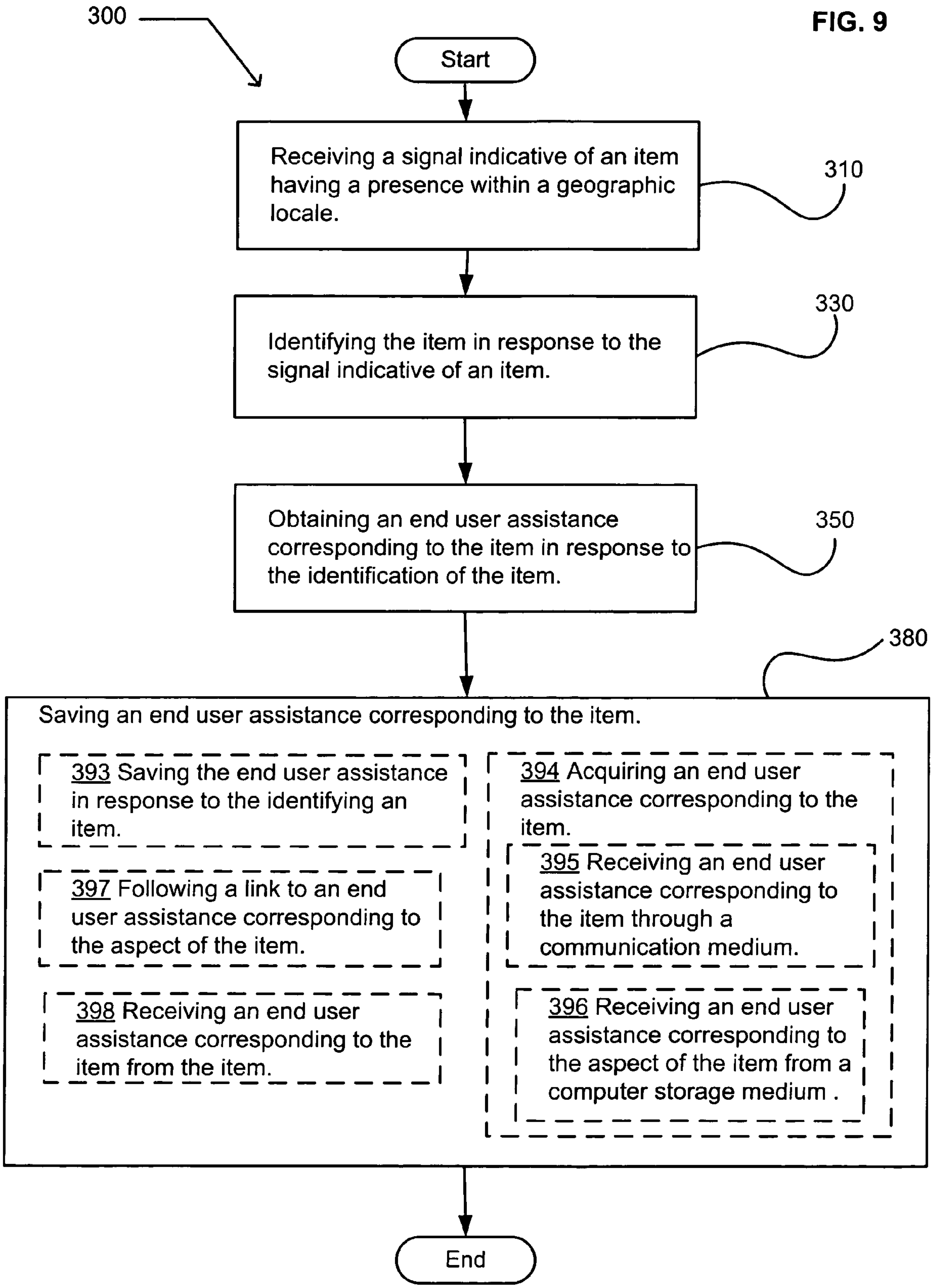
FIG. 9 illustrates an alternative embodiment of the exemplary operational flow of FIGS. 3 and 8.

FIG. 9 illustrates an alternative embodiment of the exemplary operational flow 300 of FIGS. 3 and 8. FIG. 9 illustrates an embodiment where the retention operation 380 may include at least one additional operation. Additional operations may include operations 393 through operation 398. At operation 393, the end user assistance is saved in response to the identifying an item. At operation 394, the saving the end user assistance corresponding to the item includes acquiring an end user assistance corresponding to the item. An alternative embodiment of the operation 394 may include at least one additional operation. Additional operations may include operations 395 and operation 396. At operation 395, an end user assistance corresponding to the item is received through a communication medium. For example, the communications medium may include a modulated data stream, which may be received over a wired and/or wired network connection. At operation 396, an end user assistance corresponding to the aspect of the item is received from a computer storage medium. The computer storage medium may include any medium suitable for conveyance of the end user assistance. For example, the computer storage medium may include a DVD, a CD, a diskette, an external hard drive, and a portable flash memory device. At operation 397, the acquiring an end user assistance corresponding to the item includes following a link to an end user assistance corresponding to the aspect of the item. The link may include a hyperlink. At operation 398, an end user assistance corresponding to the item maybe acquired from the item.

Figure 10:
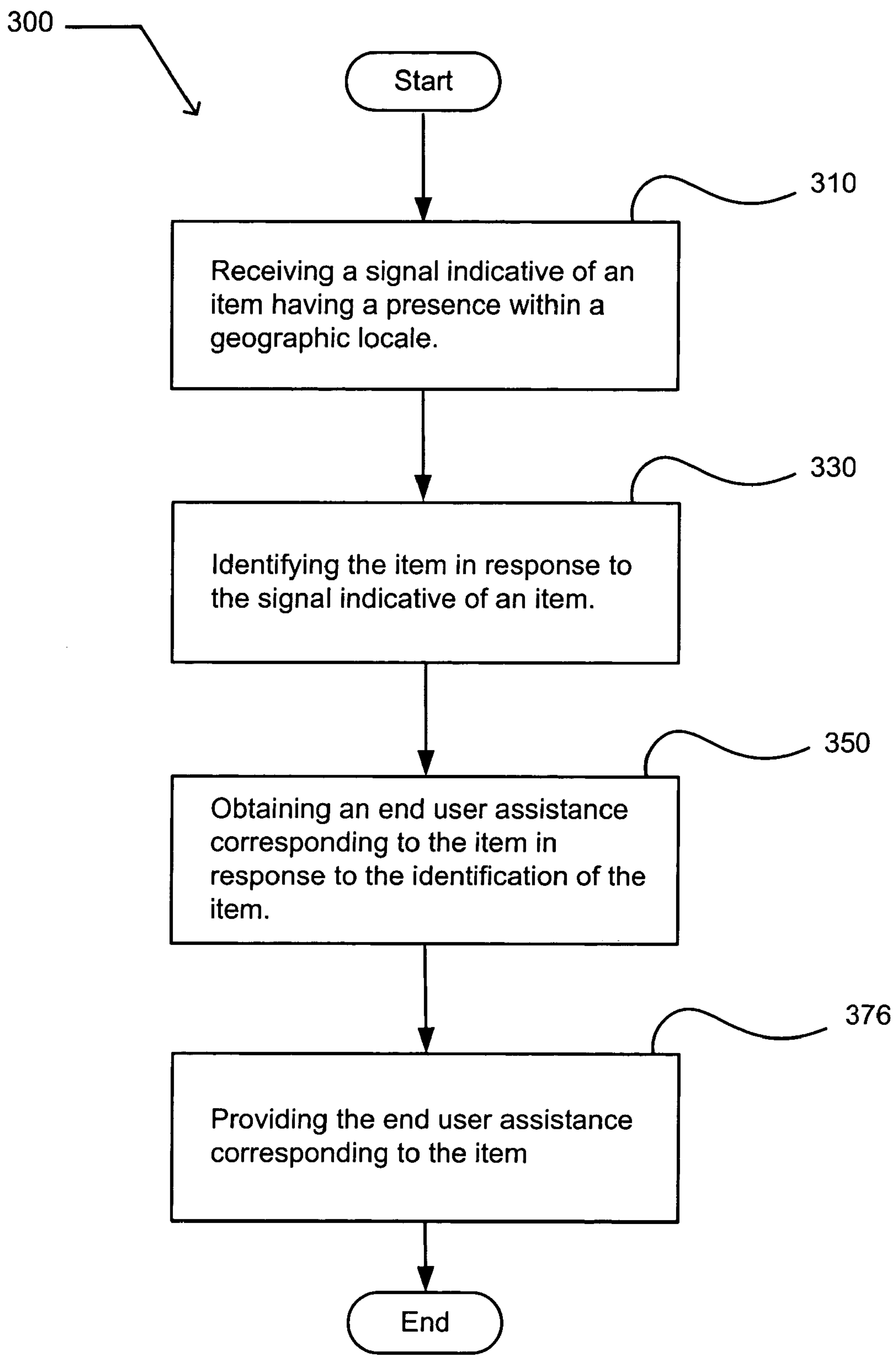
FIG. 10 illustrates an alternative embodiment of the exemplary operational flow of FIG. 3 that includes a broadcast operation.

FIG. 10 illustrates an alternative embodiment of the exemplary operational flow 300 of FIG. 3 that includes a broadcast operation 376. At the operation 376, the end user assistance corresponding to the item is provided.

Figure 11:
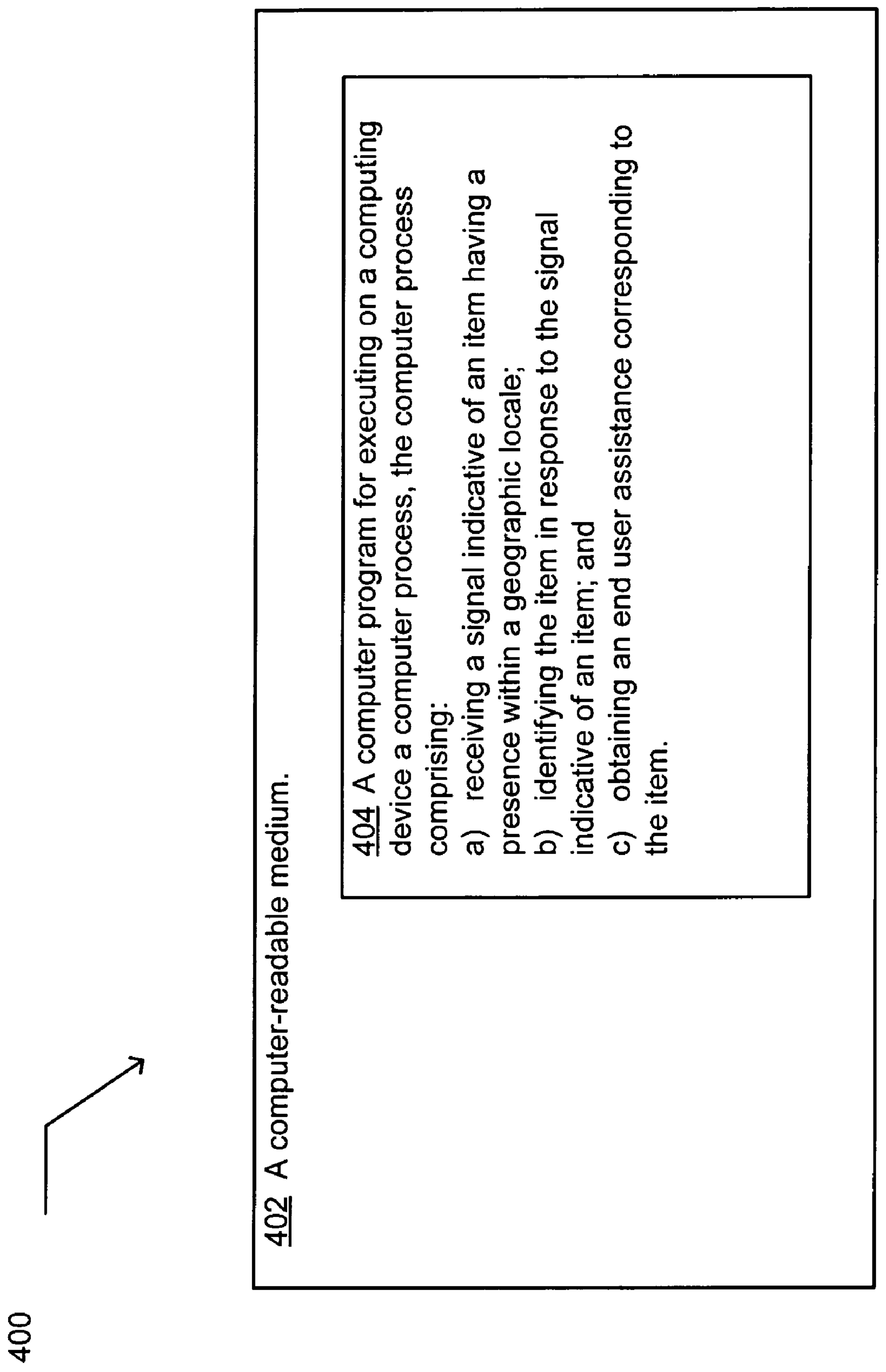
FIG. 11 illustrates a partial view of an exemplary computer program product that includes a computer program for executing a computer process on a computing device.

FIG. 11 illustrates a partial view of an exemplary computer program product 400 that includes a computer program 404 for executing a computer process on a computing device. An embodiment of the exemplary computer program product 400 is provided using a computer-readable medium 402, and includes computer executable instructions. The computer executable instructions encode the computer program 404 for executing on a computing device a process that includes receiving a signal indicative of an item having a presence within a geographic locale, identifying the item in response to the signal indicative of an item, and obtaining an end user assistance corresponding to the item. The computer-readable medium 402 may be carried by a computer-readable carrier (not shown). The computer-readable medium 402 may include a computer storage medium, which may be carried by a computer-readable carrier (not shown). The computer-readable medium 402 may include a communications medium (not shown).

Figure 12:
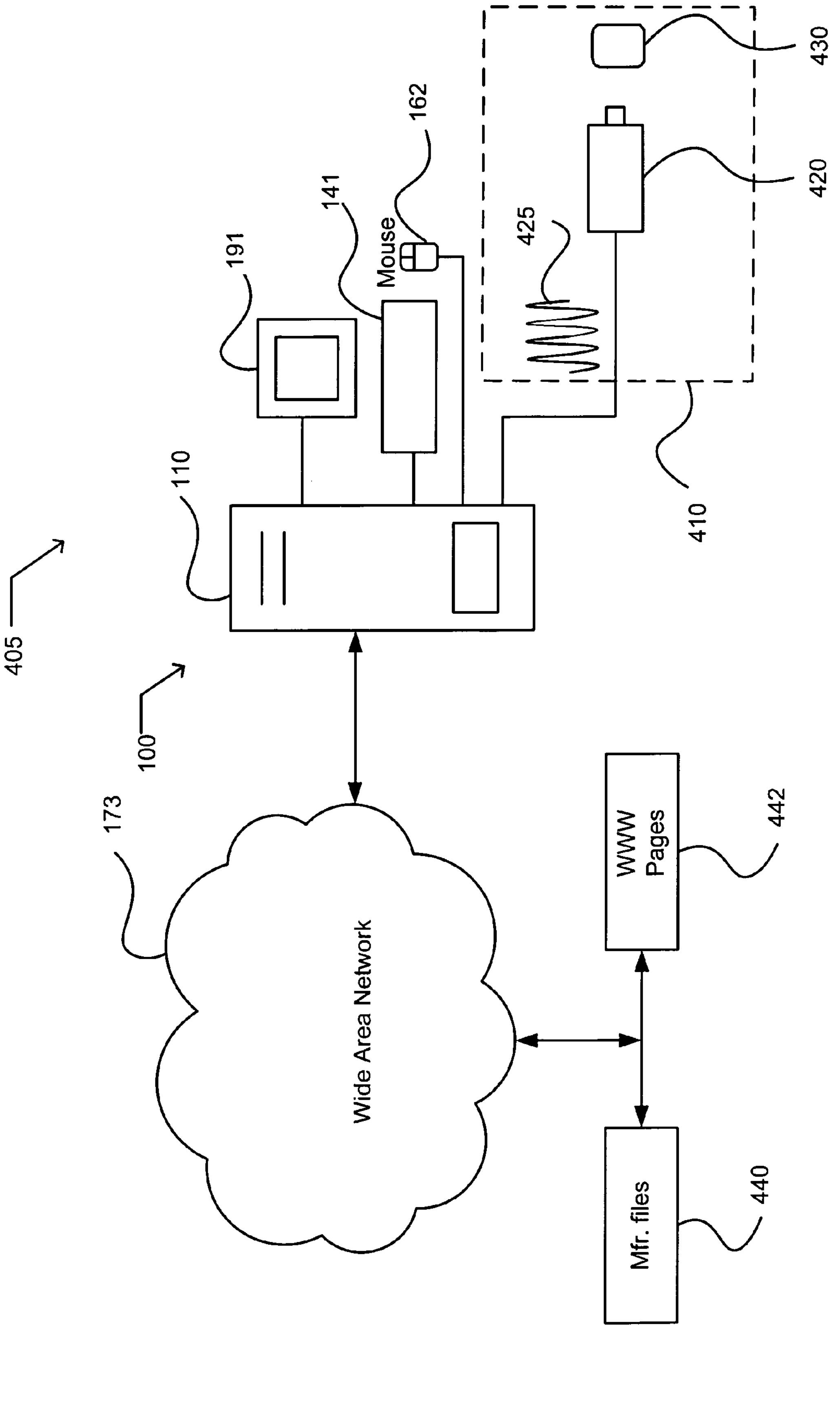
FIG. 12 illustrates an exemplary system in which embodiments may be implemented.
Figures 13, 13A, 13B, 13C, 13D:
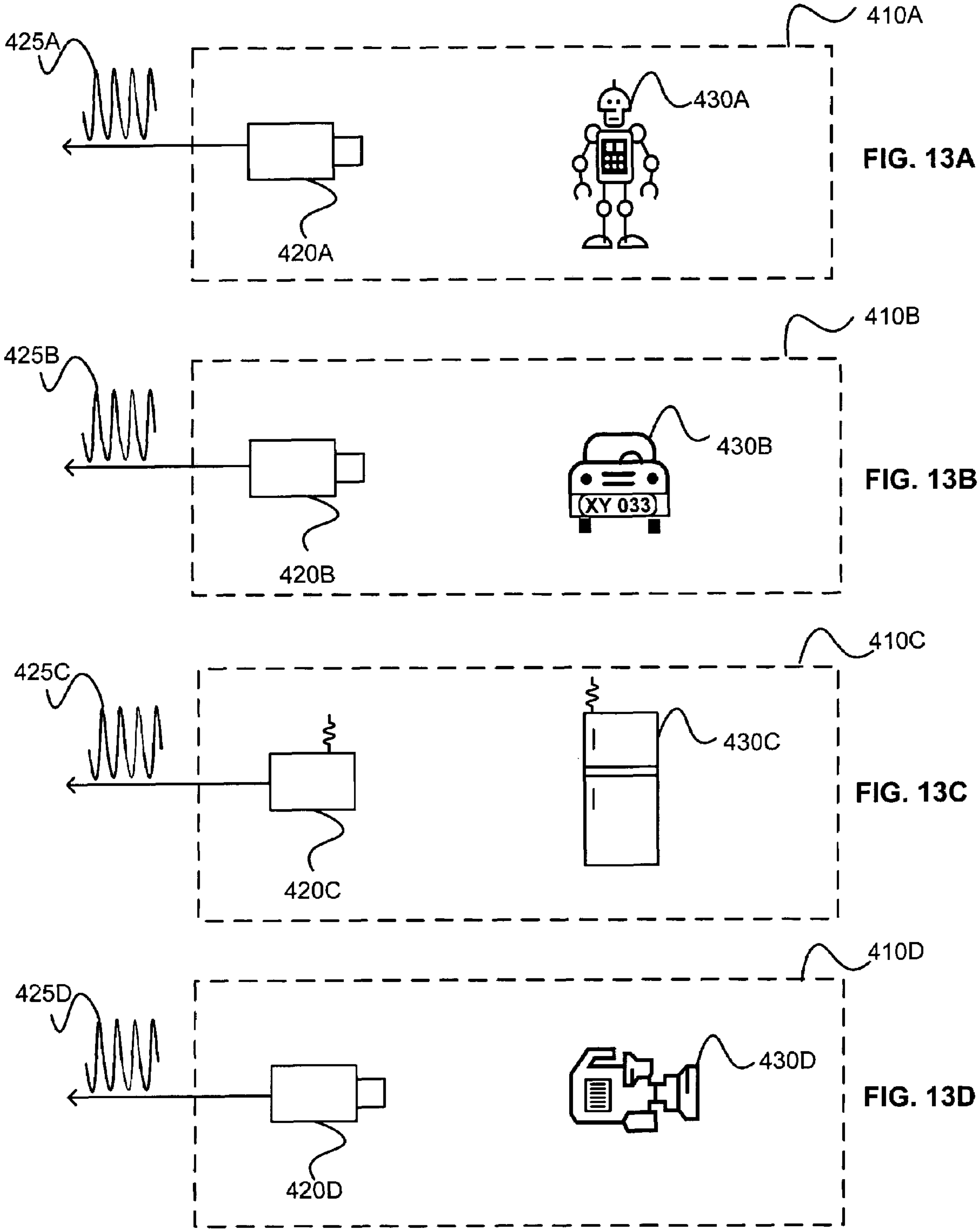
FIGS. 13A-13D illustrate certain alternative embodiments of the sensor and proximate environment of FIG. 12.

FIGS. 12 and 13 illustrate an exemplary system 405 in which embodiments may be implemented. The system 405 includes a computing system environment, illustrated as the computing system environment 100 of FIG. 1. The system 405 also includes a sensor 420 operable to provide a signal 425 indicative of an item 430 having a presence within a geographic locale 410. The computing device 110 includes an operability to receive the signal 425 indicative of an item 430. The system 405 further includes a computer program product encoding a computer program for executing on a computing device a computer process for obtaining an end user assistance, such as the computer program product 400 described in conjunction with FIG. 11. The computer process includes receiving the signal 425 indicative of an item having a presence within a geographic locale 410, and identifying the item in response to the signal indicative of an item. The computer process also includes obtaining an end user assistance corresponding to the item having a presence within a geographic locale.

In an embodiment, the geographic locale may include any environment in which one more items, such as the item 430, may have a presence. The geographic locale may include a bounded environment. For example and without limitation, in certain embodiments, the geographic locale may include a portion of a residential premises or the entire residential premises. The premises may be under control of one or more persons, such as an individual or a family. In other embodiments, the geographic locale may include a portion of a business premises or the entire business premises.

The sensor 420 may include any type of sensor suitable for generating a signal indicative of an item having a presence within its sensing and/or detection range, such as the signal 425 indicative of the item 430. By way of example and without limitation, in an embodiment, the sensor 420 may be positioned in a premises entrance such that items entering and leaving the premises have a presence at some time proximate to the sensor. In another embodiment, the sensor 420 may be physically located within the geographic locale 410. In a further embodiment, the sensor 420 may be proximate to the geographic locale 410 and operable to provide the signal 425 indicative of an item 430 having a presence within the geographic locale.

In an alternative embodiment, the system 405 may include a plurality (not shown) of the sensors 420. The plurality of sensors may include at least two sensors having different sensing parameters, each respectively operable to provide a different signal 425 indicative of the item 430. FIGS. 13A-13D illustrate certain alternative embodiments of the sensor 420 and a proximate environment, illustrated as embodiments 420A-420D and geographic locales 410A-410D.

FIG. 13A illustrates an alternative embodiment that includes a sensor 420A located within a geographic locale 410A. The sensor 420A includes an optical sensor parameter operable to provide a signal 425A indicative of an optical aspect of an item 430A within the geographic locale, illustrated as a known shape of the 3CPO from the movie Star Wars. An optical aspect may include any optical aspect or aspects useful in identifying the item. FIG. 13B illustrates an alternative embodiment that includes a sensor 420B positioned with a geographic locale 410B. The sensor 420B includes an optical sensor parameter operable to provide a signal 425B indicative of an alpha/numeric aspect of the item 430B within the geographic locale, illustrated as a license plate number XY 033 of a car.

FIG. 13C illustrates an alternative embodiment that includes a sensor 420C located within a geographic locale 410C. The sensor 420C includes an identification signal sensor parameter operable to receive an electronically transmitted designator (not shown) associated with the item and provide a signal 425C indicative of item. The item is illustrated as a refrigerator 430C with an associated electronically transmitted designator. For example, the electronically transmitted designator may be transmitted by an RFID device. FIG. 13D illustrates an alternative embodiment that includes a sensor 420D positioned within a geographic locale 410D. The sensor 420D includes an optical code reader parameter operable to provide a signal 425D indicative of an optically readable aspect or aspects useful in identifying the item 430D. The item 430D is illustrated as video camera with an optically readable bar code. The signals 425A-425D are received by the computing device 110 of computing system environment 100 of FIG. 12.

Figure 14:
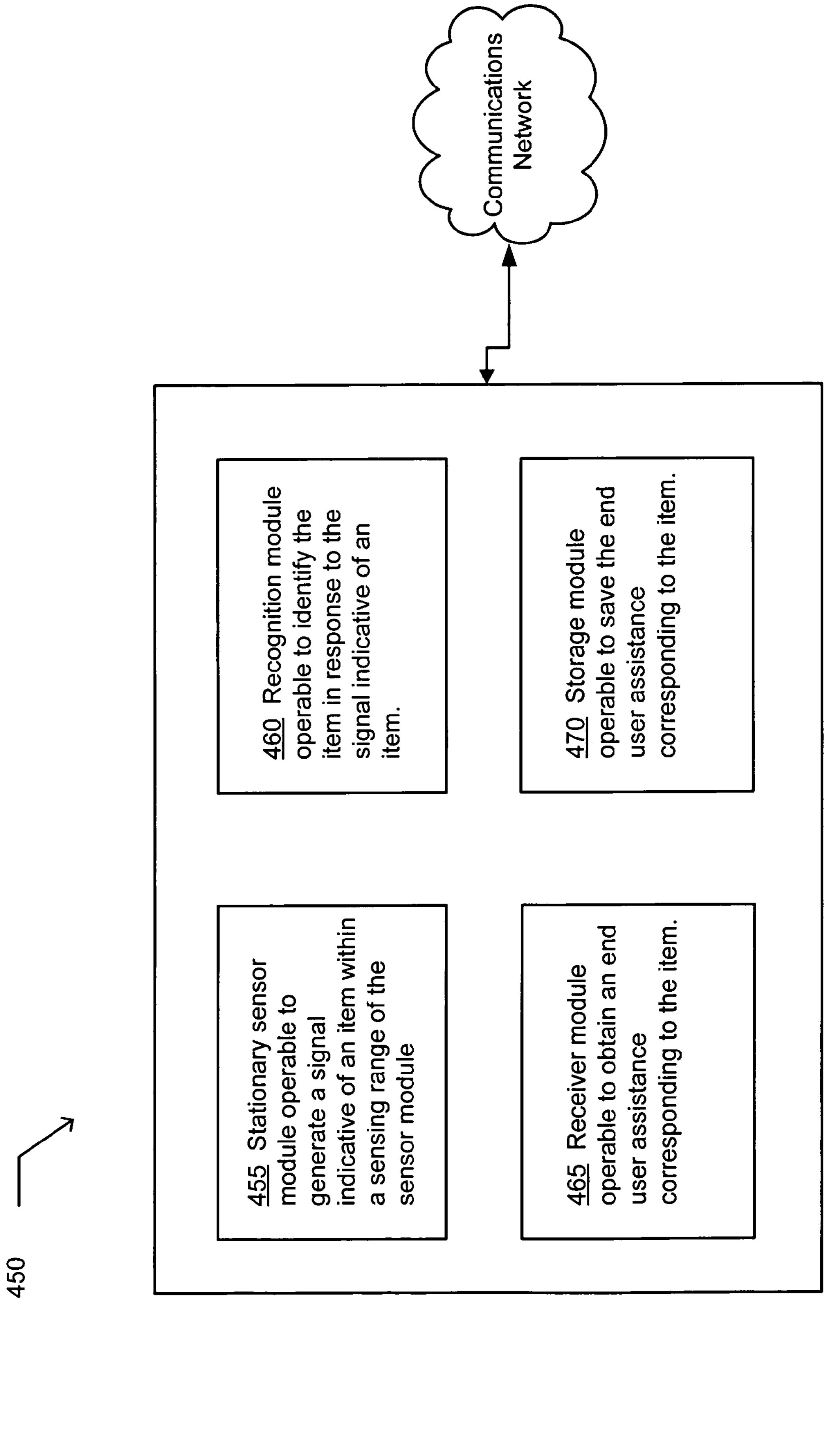
FIG. 14 illustrates an exemplary system in which embodiments may be implemented.

FIG. 14 illustrates an exemplary system 450 in which embodiments may be implemented. The system 450 includes a stationary sensor module 455 operable to generate a signal indicative of an item within a sensing range of the sensor module. In an embodiment, the stationary sensor module 455 is placed in a location selected to sense one or more items that may be under control of a user over time. While the stationary sensor module 455 may be relatively permanently located in an embodiment, another embodiment provides the stationary sensor module 455 being relatively moveable within a premises. The system 450 also includes a recognition module 460 operable to identify the item in response to the signal indicative of an item, and a receiver module 465 operable to obtain an end user assistance corresponding to the identified item. In an alternative embodiment, the system 450 may include a storage module 470 operable to save the end user assistance corresponding to the item.

Figure 15:
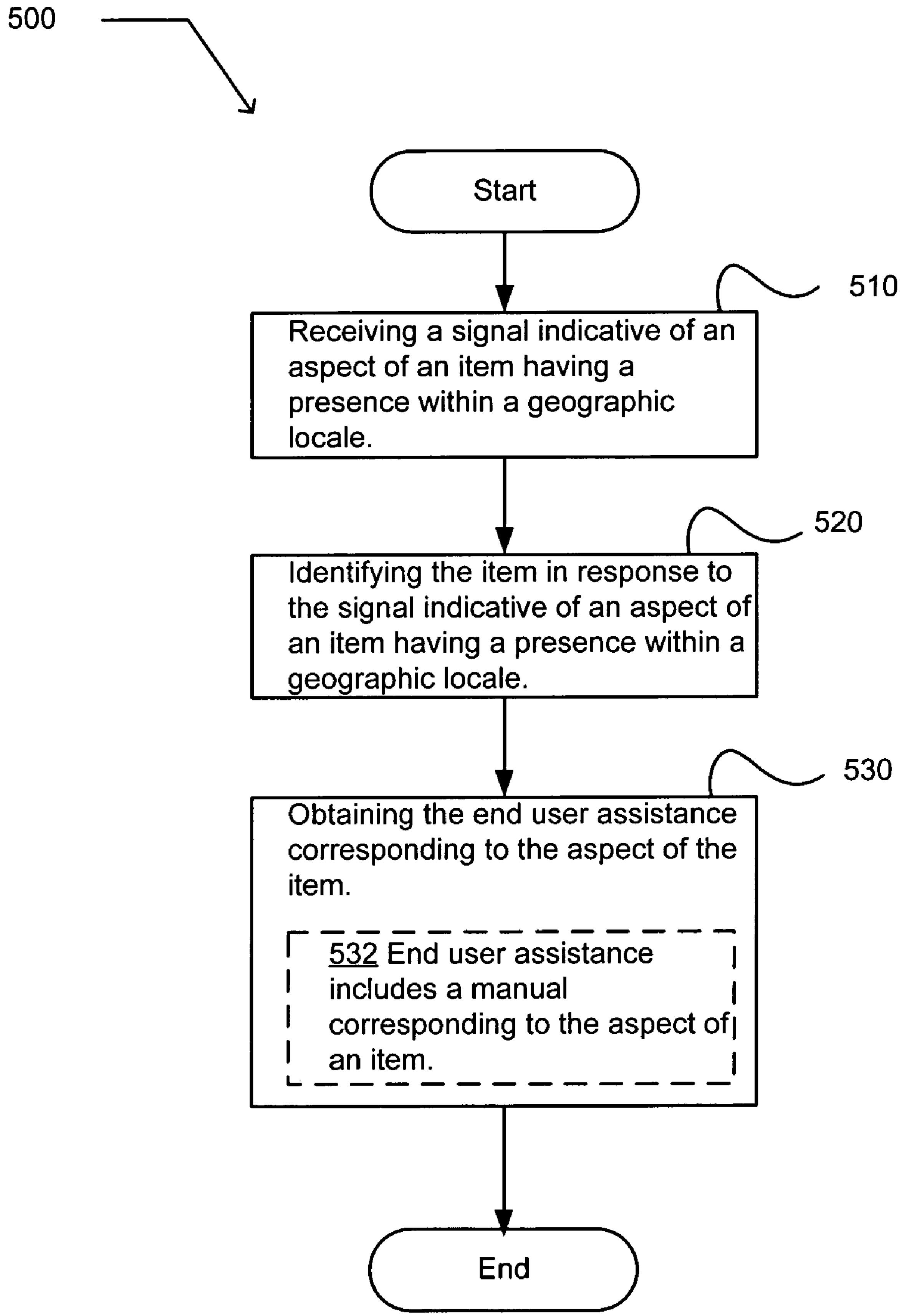
FIG. 15 illustrates an operational flow representing exemplary operations that obtain an assistance corresponding to an item having presence within a geographic locale.

FIG. 15 illustrates an operational flow 500 representing exemplary operations that obtain an assistance corresponding to an item having presence within a geographic locale. After a start operation, the operational flow 500 moves to an acquisition operation 510, wherein a signal indicative of an aspect of an item having a presence within a geographic locale is received, such as the signal 425 indicative of the item 420 with the geographic locale 410 of FIG. 12. At a recognition operation 520, the item is identified in response to the signal indicative of an aspect of an item having a presence within a geographic locale. Operational flow 500 moves to a reception operation 530, where the end user assistance corresponding to the aspect of the item is obtained. In an alternative embodiment, the operation 530 may include an operation 532, wherein the end user assistance corresponding to an aspect of an item includes a manual corresponding to the aspect of an item. In an alternative embodiment, the reception operation may include an operation (not shown) wherein a manual corresponding to the aspect of the item is obtained. The manual may include any content associated with the item, such as assistance information, instructions, and specifications. The operational flow 500 then moves to an end operation.

Figure 16:
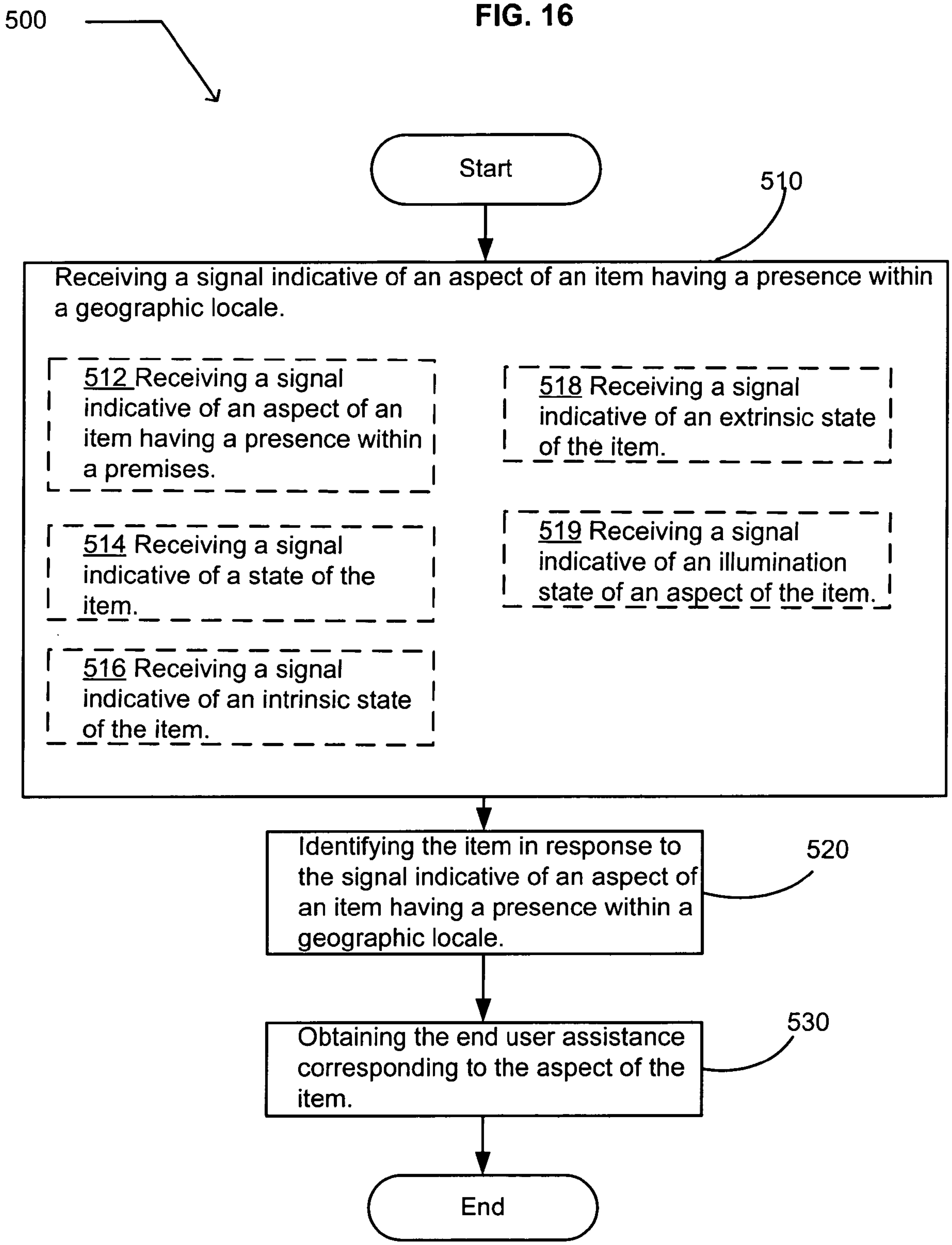
FIG. 16 illustrates an alternative embodiment of the exemplary operational flow of FIG. 15.

FIG. 16 illustrates an alternative embodiment of the exemplary operational flow 500 of FIG. 15. FIG. 16 illustrates an embodiment where the reception operation 510 may include at least one additional operation. The additional operations may include an operation 512, an operation 514, an operation 516, an operation 518, and an operation 519. At operation 512, a signal indicative of an aspect of an item having a presence within a premises is received. At operation 514, a signal indicative of a state of the item is received. At the operation 516, a signal indicative of an intrinsic state of the item is received. At the operation 518, a signal indicative of an extrinsic state of the item is received. At the operation 519, a signal indicative of an illumination state of an aspect of the item is received.

Figure 17:
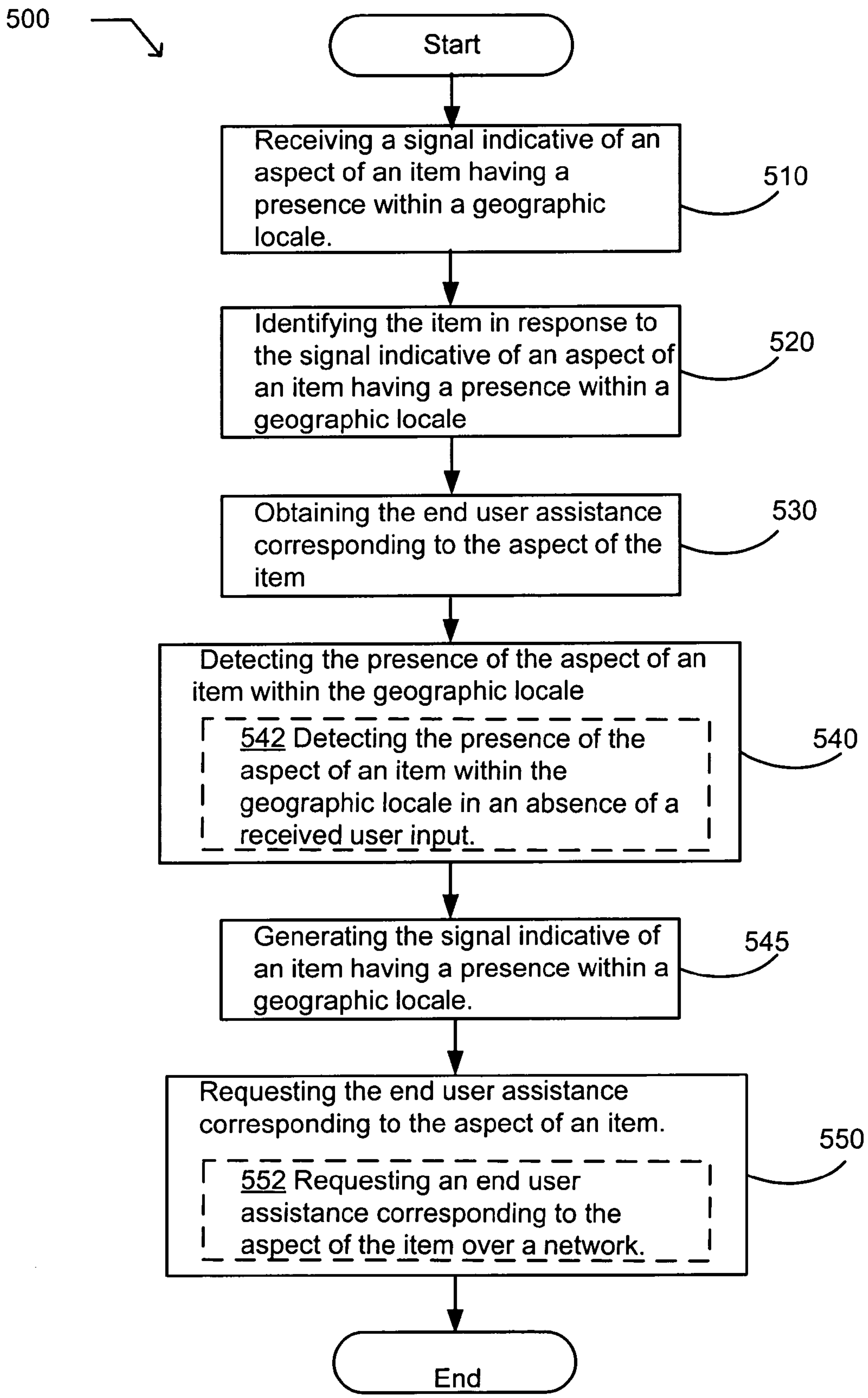
FIG. 17 illustrates another alternative embodiment of the exemplary operational flow of FIG. 15.

FIG. 17 illustrates an alternative embodiment of the exemplary operational flow 500 of FIG. 15. FIG. 17 illustrates an embodiment where the operational flow 500 may include a discovery operation 540, a generating operation 545, and a requesting operation 550. The discovery operation 540 includes detecting the presence of the aspect of an item within the geographic locale. In a further alternative embodiment, the discovery operation 540 may include an operation 542. At operation 542, the presence of the aspect of an item within the geographic locale is detected in an absence of a received user input. At the operation 545, the signal indicative of an item having a presence within a geographic locale is generated. At the request an operation 550, the end user assistance corresponding to the aspect of an item is requested. In a further alternative embodiment, the request operation 550 may include an operation 552. At operation 552, an end user assistance corresponding to the aspect of the item is requested over a network. The requesting an end user assistance over a network may include requesting an end user assistance from a server. The operational flow 500 may in another embodiment include a providing operation (not shown). The providing operation includes providing the end user assistance corresponding to the aspect of the item.

Figure 18:
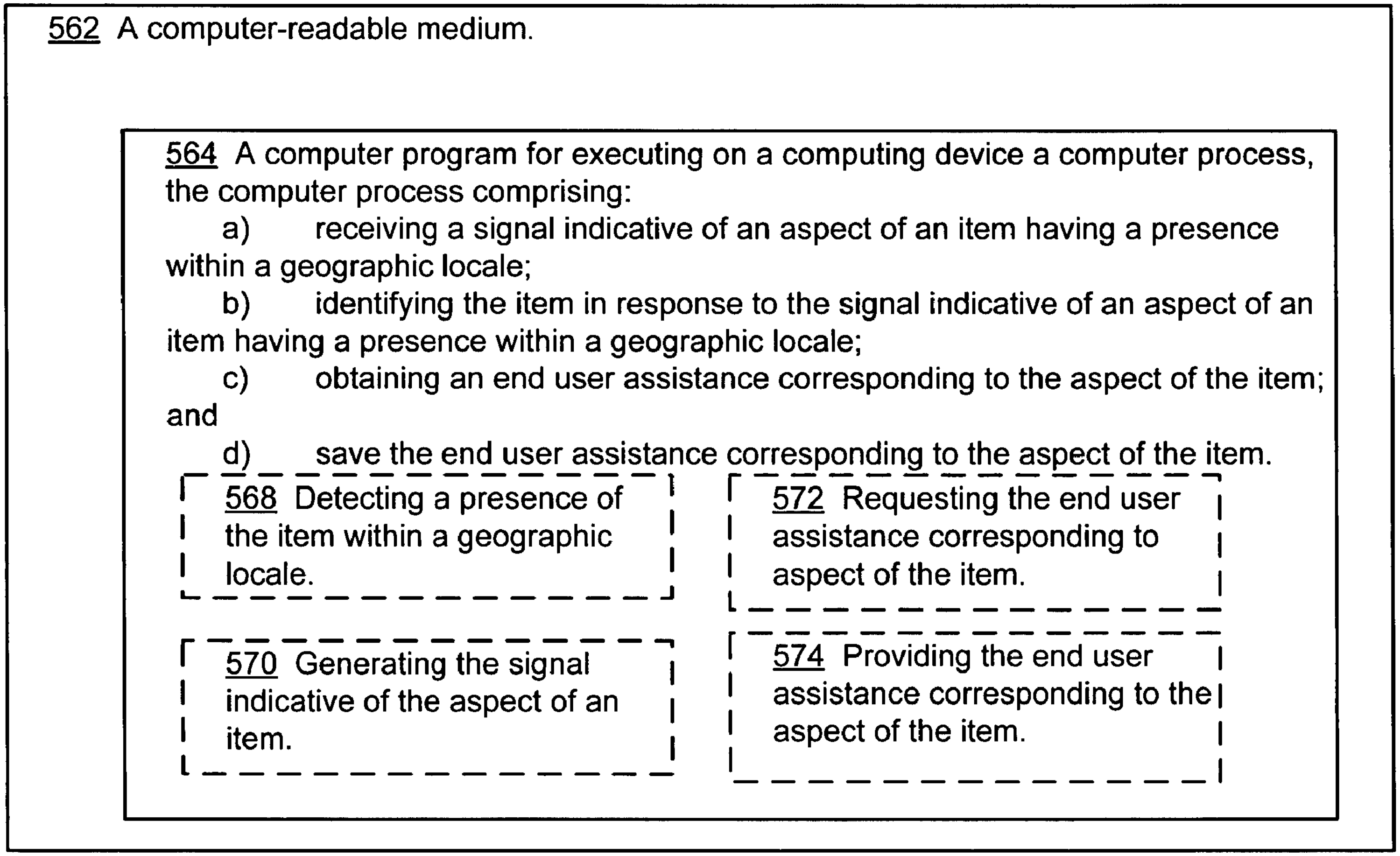
FIG. 18 illustrates a partial view of an exemplary computer program product that includes a computer program for executing a computer process on a computing device.

FIG. 18 illustrates a partial view of an exemplary computer program product 560 that includes a computer program 564 for executing a computer process on a computing device. An embodiment of the exemplary computer program product 560 may be provided using a computer-readable medium 562, and includes computer executable instructions. The computer executable instructions encode the computer program 564 for executing on a computing device a process that includes receiving a signal indicative of an aspect of an item having a presence within a geographic locale, and identifying the item in response to the signal indicative of an aspect of an item having a presence within a geographic locale. The computer program 564 also includes obtaining an end user assistance corresponding to the aspect of the item, and saving the end user assistance corresponding to the aspect of the item. In certain embodiments, the computer program 564 may also include at least one additional process, such as a process 568, a process 570, a process 572, and a process 574. The process 568 includes detecting a presence of the item within a geographic locale. The process 570 includes generating a signal indicative of the aspect of an item. The process 572 includes requesting the end user assistance corresponding to aspect of the item. The process 574 includes providing the end user assistance corresponding to the aspect of the item. The computer-readable medium 562 may include a computer storage medium, which may be carried by a computer-readable carrier (not shown). The computer-readable medium 562 may include a communications medium (not shown).

Figure 19:
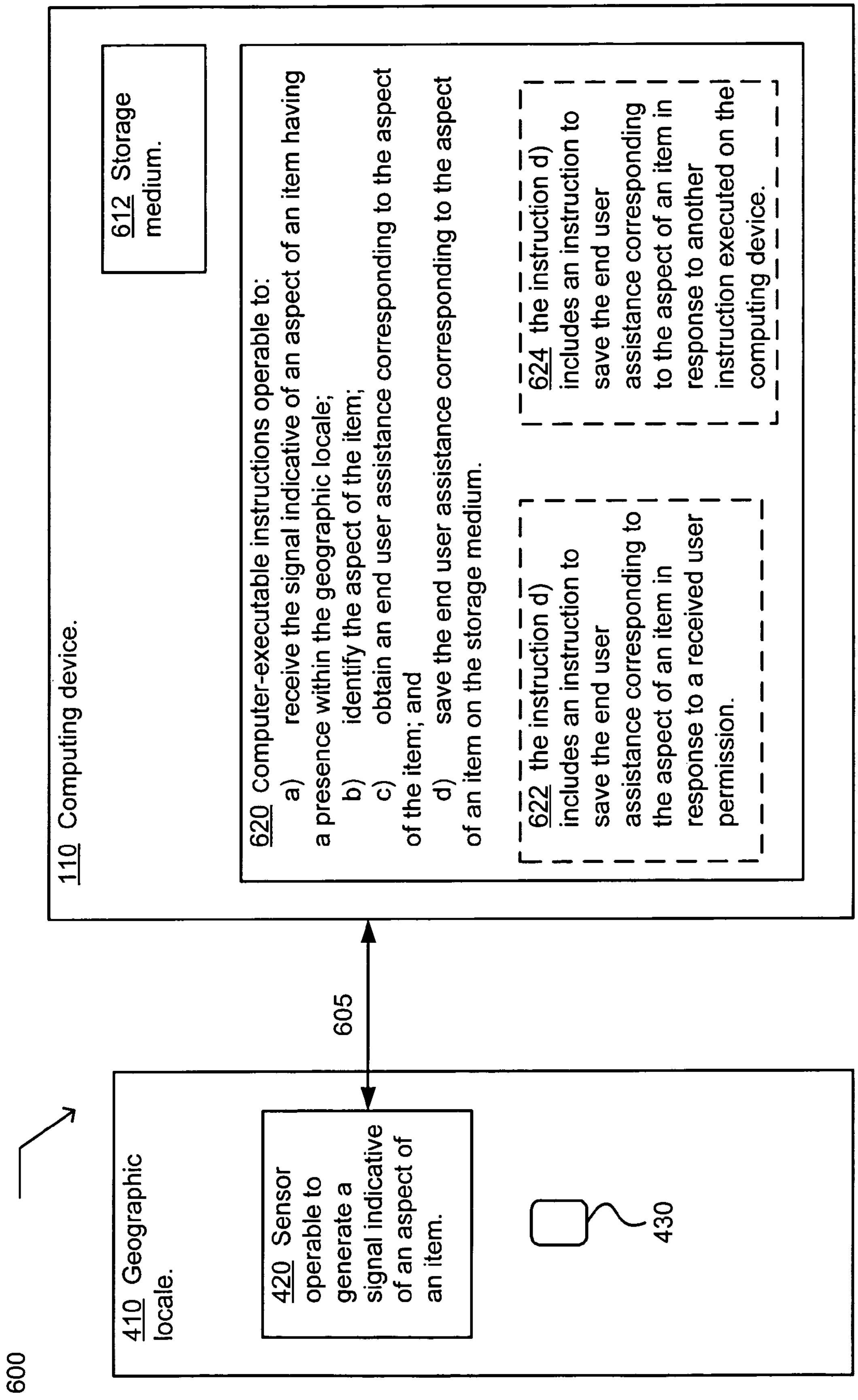
FIG. 19 illustrates an exemplary system in which embodiments may be implemented.

FIG. 19 illustrates an exemplary system 600 in which embodiments may be implemented. The system 600 includes a computing system environment that includes a computing device, illustrated as the computing device 110 of FIG. 1. The system 600 also includes the sensor 420 operable to generate a signal (not shown) indicative of an aspect of the item 430 having a presence within the geographic locale 410. The computing device 110 includes a storage medium 612, and is operable to receive the signal indicative of an aspect of an item through a coupling 605 between the sensor 420 and the computing device 110. The storage medium 612 may be any computer storage media. The system 600 further includes computer executable instructions 620 that when executed on the computing device causes the computing device to receive the signal indicative of an aspect of an item having a presence within the geographic locale, and identify the aspect of the item. The instructions further obtain an end user assistance corresponding to the aspect of the item, and save the end user assistance corresponding to the aspect of an item on the storage medium 612. The computer executable instructions 620 may include at least one additional operation. At operation 622, the instruction d) to save the end user assistance corresponding to the aspect of an item includes an instruction to save the end user assistance corresponding to the aspect of an item in response to a received user permission. At operation 624, the instruction d) to save the end user assistance corresponding to the aspect of an item includes an instruction to save the end user assistance corresponding to the aspect of an item in response to another instruction executed on the computing device 110.

Figure 20:
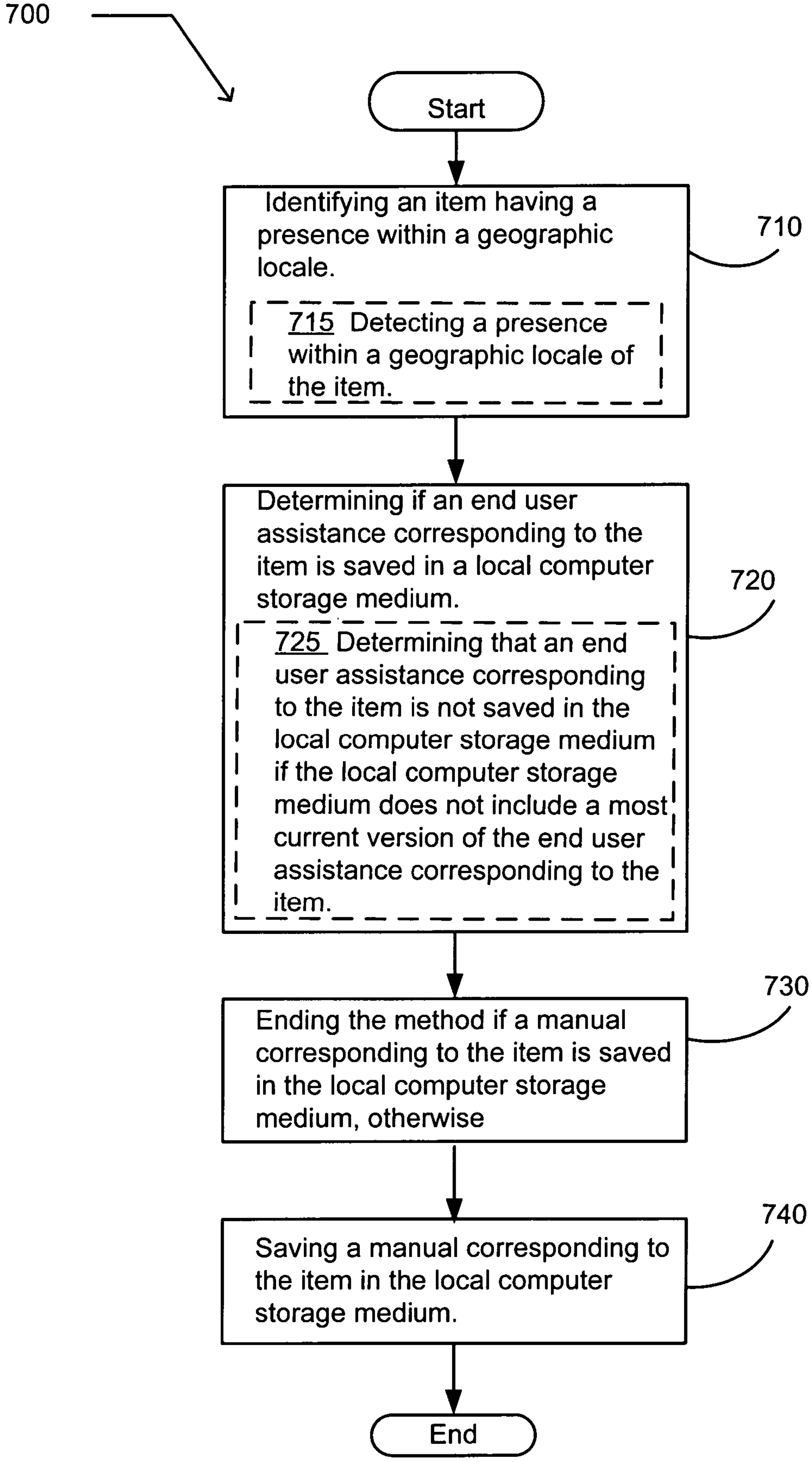
FIG. 20 illustrates an operational flow representing an exemplary operation that saves an end user assistance corresponding to an item having presence within a geographic locale.

FIG. 20 illustrates an operational flow 700 representing exemplary operations that save an end user assistance corresponding to an item having presence within a geographic locale. After a start operation, the operational flow 700 moves to a recognition operation 710 wherein an item having a presence within a geographic locale is identified. At discovery operation 720, a determination is made if an end user assistance corresponding to the item is saved in a computer storage medium local to the geographic locale. At termination operation 730, the operational flow 700 is ended if an end user assistance corresponding to the item is saved in the local computer storage medium. Otherwise, the operation flow 700 moves to retention operation 740, wherein an end user assistance corresponding to the item is saved in the local computer storage medium. The operational flow 700 then moves to an end operation.

In an alternative embodiment, the recognition operation 710 may include a sensing operation 715. At operation 715, a presence of the item within the geographic locale is detected. In another embodiment, the discovery operation 720 may include an operation 725. At the operation 725, a determination is made that an end user assistance corresponding to the item is not saved in the local computer storage medium if the local computer storage medium does not include a most current version of the end user assistance corresponding to the item.

Figure 21:
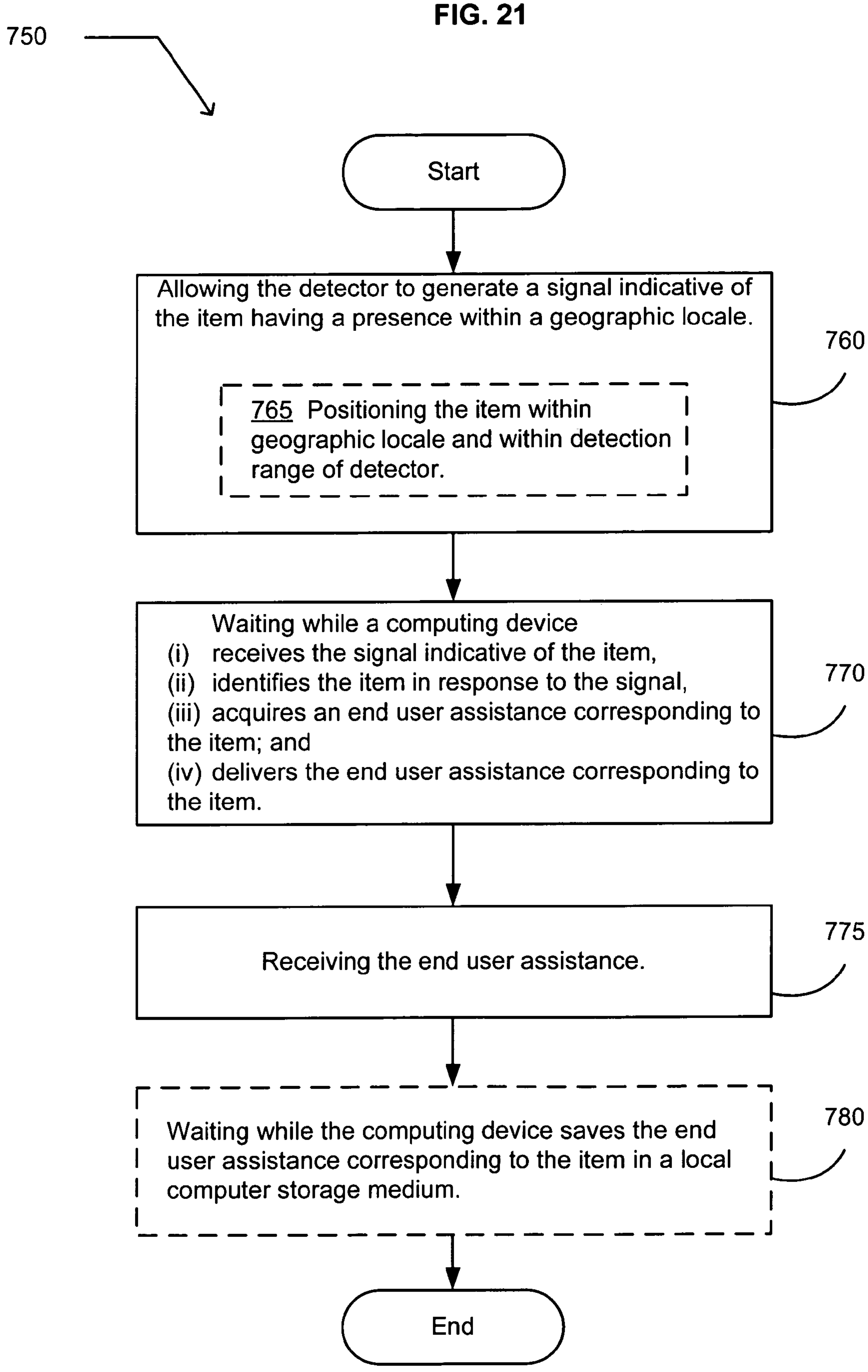
FIG. 21 illustrates an operational flow representing exemplary operations implemented in a computing device for receiving an end user assistance corresponding to an item having presence within a geographic locale.

FIG. 21 illustrates an operational flow 750 representing exemplary operations implemented in a computing device for receiving an end user assistance corresponding to an item having presence within a geographic locale. After a start operation, the operational flow 750 moves to a discovery operation 760 wherein a detector is allowed to generate a signal indicative of an item having a presence within a geographic locale. At operation 770, the operational flow 750 includes waiting while a computing system receives the signal indicative of the item, identifies the item in response to the signal, acquiring an end user assistance corresponding to the item, and delivers the end user assistance corresponding to the item. At operation 775, the end user assistance is received. The operational flow 750 then moves to an end operation. In an alternative embodiment, the discovery operation 760 may include an additional operation, such as an operation 765. At the operation 765, the item and the detector are positioned within a detection range that allows the detector to generate a signal indicative of the item. In a further alternative embodiment, the operational flow 750 may include an additional operation 780. The operation 780 includes a waiting while the computing device saves the end user assistance corresponding to the item in a local computer storage medium.

Figure 22:
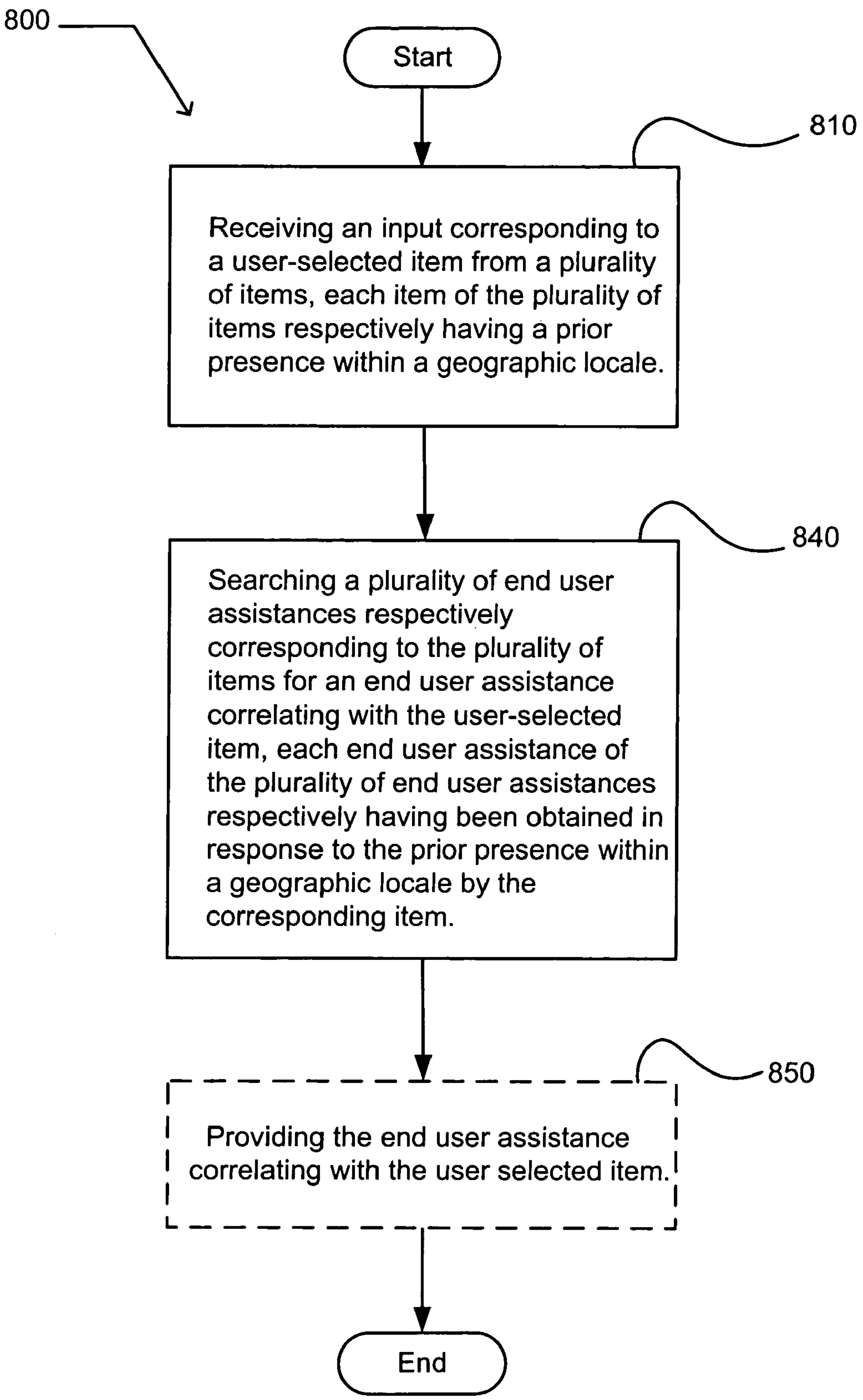
FIG. 22 illustrates an operational flow representing exemplary operations implemented in a computing device that searches a plurality of end user assistances for an end user assistance.

FIG. 22 illustrates an operational flow 800 representing exemplary operations implemented in a computing device that searches a plurality of end user assistances for an end user assistance. After a start operation, the operational flow moves to a user interaction operation 810. At the operation 810, an input is received corresponding to a user-selected item from a plurality of items, each item of the plurality of items respectively having a prior presence within a geographic locale. At a seeking operation 840, a plurality of end user assistances respectively corresponding to the plurality of items are searched for an end user assistance correlating with the user-selected item. Each end user assistance of the plurality of end user assistances respectively having been obtained in response to the prior presence within a geographic locale of the corresponding item. In an alternative embodiment, the process 800 may include additional operations, such as a broadcast operation 850. At the operation 850, the end user assistance correlating with the user-selected item is provided. The operational flow 800 then moves to an end operation.

Figure 23:
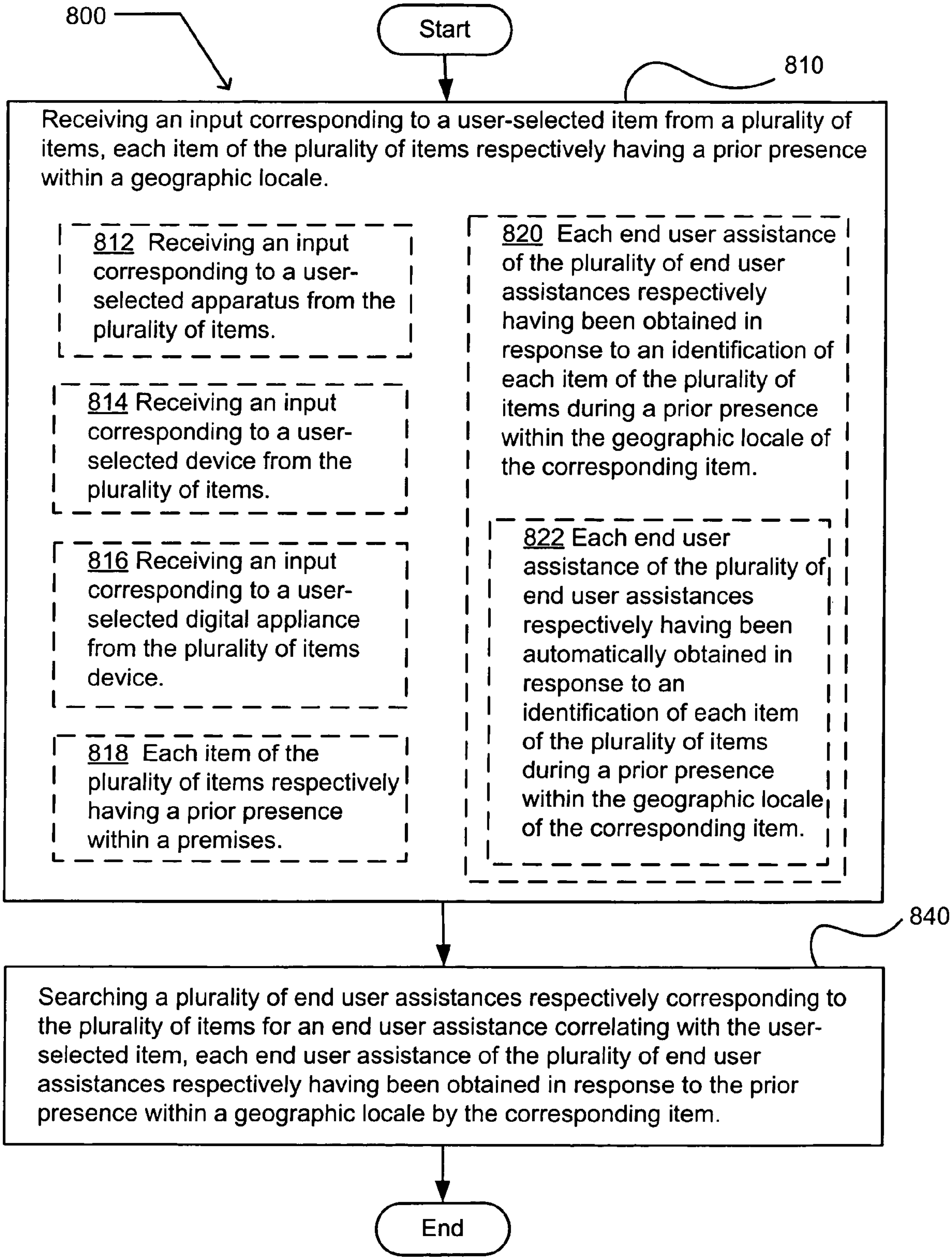
FIG. 23 illustrates an alternative embodiment of the exemplary operational flow of FIG. 22.

FIG. 23 illustrates an alternative embodiment of the exemplary operational flow 800 of FIG. 22. FIG. 23 illustrates an embodiment where the user interaction operation 810 may include at least one additional operation. Additional operations may include an operation 812, an operation 814, an operation 816, an operation 818, and an operation 820. At the operation 812, an input corresponding to a user-selected apparatus from the plurality of items is received. At the operation 814, an input corresponding to a user-selected device from the plurality of items is received. At the operation 816, an input is received corresponding to a user-selected digital appliance from the plurality of items device. At the operation 818, each item of the plurality of items respectively has a prior presence within a premises. At the operation 820, each end user assistance of the plurality of end user assistances respectively has been obtained in response to an identification of each item of the plurality of items during a prior presence within the geographic locale of the corresponding item. The operation 820 may include one or more additional operations, such as the operation 822. At the operation 822, each end user assistance of the plurality of end user assistances respectively has been automatically obtained in response to an identification of each item of the plurality of items during a prior presence within the geographic locale of the corresponding item.

Figure 24:
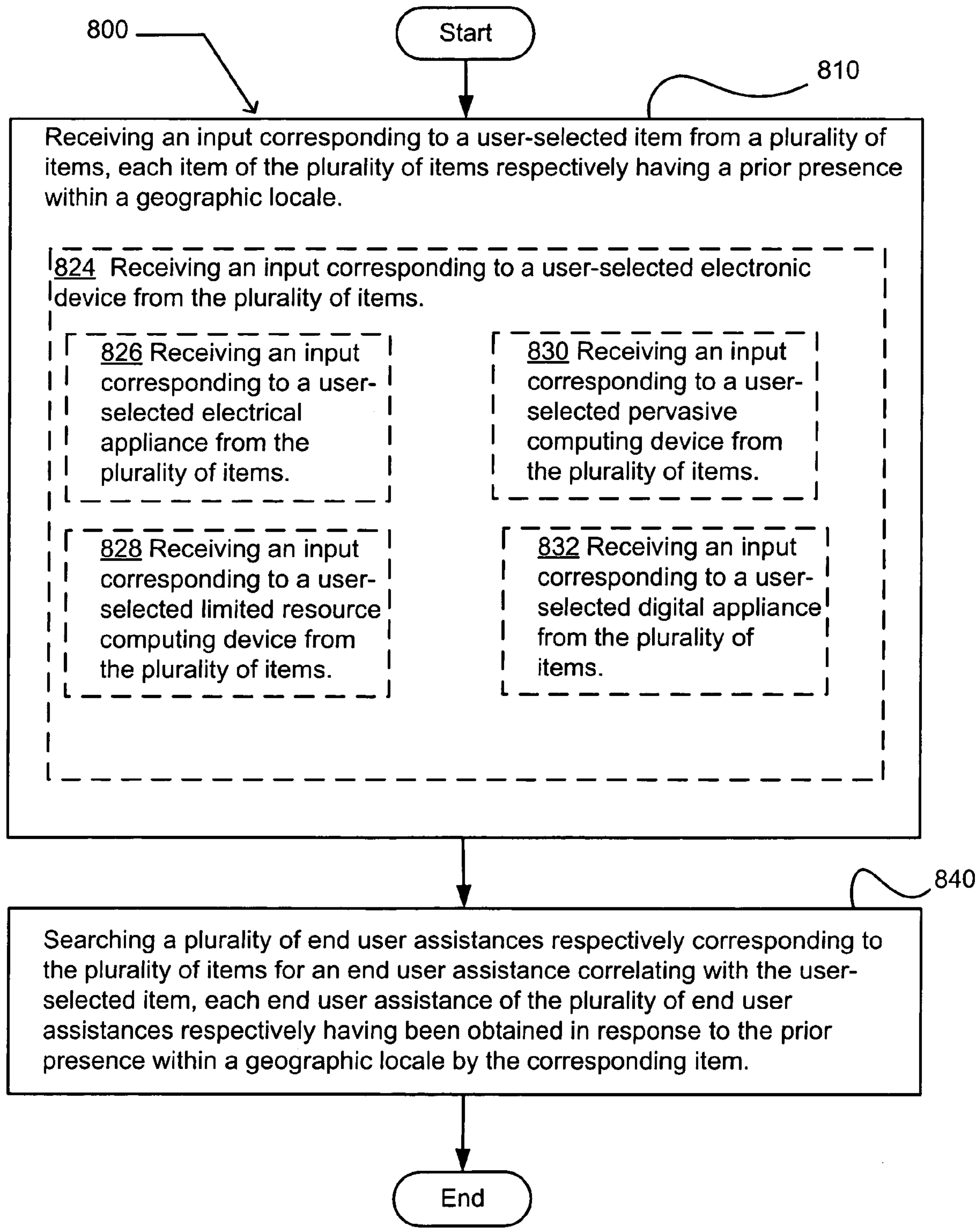
FIG. 24 illustrates another alternative embodiment of the exemplary operational flow of FIG. 22.

FIG. 24 illustrates an alternative embodiment of the exemplary operational flow 800 of FIG. 22. FIG. 24 illustrates an embodiment where the user interaction operation 810 may include at least one additional operation. Additional operations may include an operation 824. At the operation 824, an input is received corresponding to a user-selected electronic device from the plurality of items. The operation 820 may include at least one additional operation. Additional operations may include an operation 826, an operation 828, an operation 830, and an operation 832. At the operation 826, an input is received corresponding to the user-selected electrical appliance from the plurality of items. At the operation 828 an input is received corresponding to a user-selected limited resource computing device from the plurality of items. At the operation 830, an input is received corresponding to a user-selected pervasive computing device from the plurality of items. At the operation 832, an input is received corresponding to a user-selected digital appliance from a plurality of items.

Figure 25:
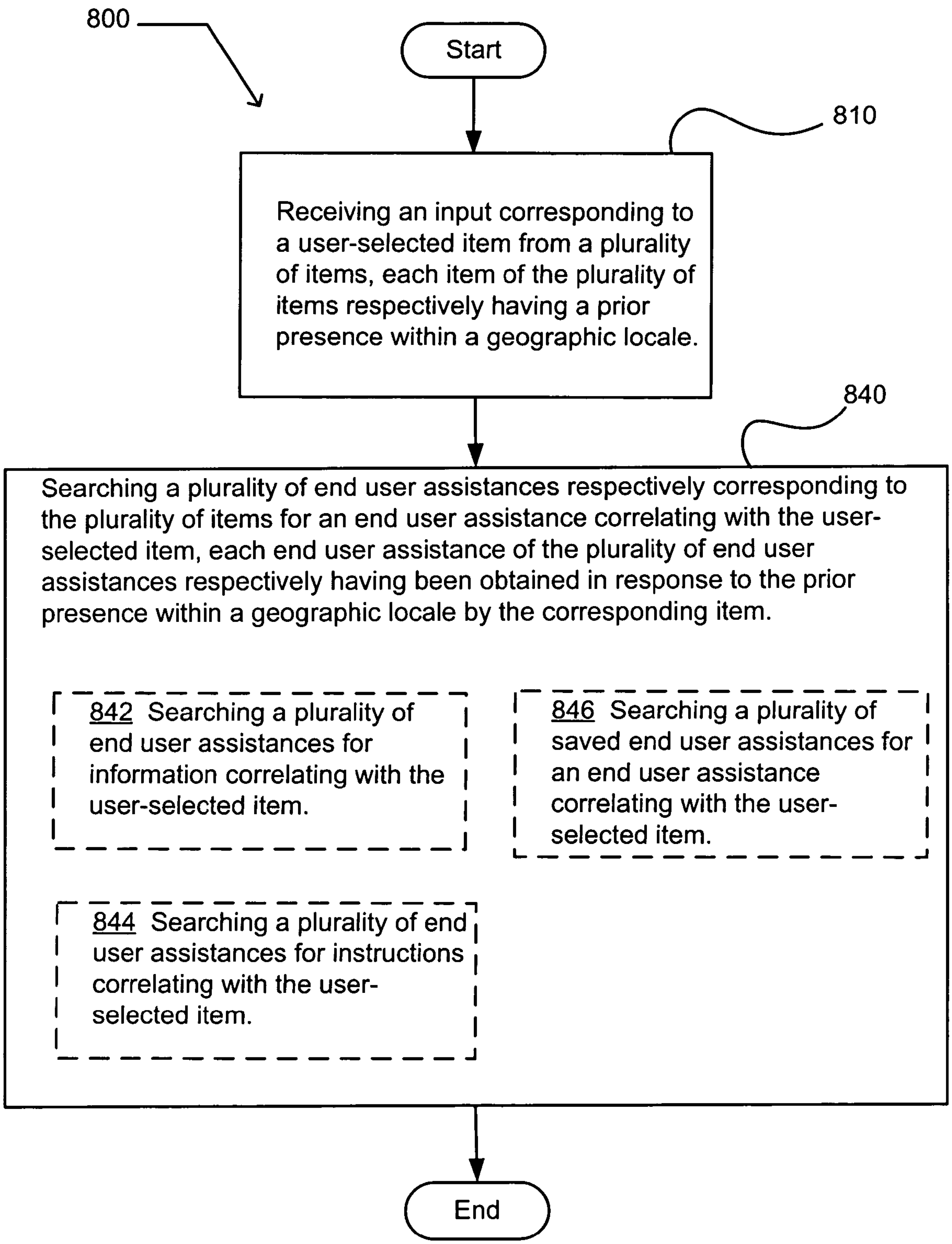
FIG. 25 illustrates a further alternative embodiment of the exemplary operational flow of FIG. 22.

FIG. 25 illustrates an alternative embodiment of the exemplary operational flow 800 of FIG. 22. FIG. 25 illustrates an embodiment where the seeking operation 840 may include at least one additional operation. Additional operations may include an operation 842, an operation 844, and an operation 846. At the operation 842, a plurality of end user assistances are searched for information correlating with the user-selected item. At the operation 844, a plurality of end user assistances are searched for instructions correlating with the user-selected item. At the operation 846, a plurality of saved end user assistances are searched for an end user assistance correlating with the user-selected item.

FIG. 26 illustrates a partial view of an exemplary computer program product 870 that includes a computer program 874 for executing a computer process on a computing device. An embodiment of the exemplary computer program product 870 may be provided using the computer-readable medium 872, and includes computer executable instructions. The computer executable instructions encode the computer program 874 for executing on a computer system a process. The process includes receiving an input corresponding to a user-selected item from a plurality of items. Each item of the plurality of items respectively having a prior presence within a geographic locale. The process further includes searching a plurality of end user assistances respectively corresponding to the plurality of items for an end user assistance correlating with the user-selected item. Each end user assistance of the plurality of end user assistances respectively having been obtained in response to the prior presence within a geographic locale of the corresponding item. In an alternative embodiment, the process may include at least one additional instruction. Additional instructions may include an instruction 876, providing the end user assistance correlating with the user-selected item. The computer-readable medium 872 may include a computer storage medium, which may be carried by a computer-readable carrier (not shown). The computer-readable medium 872 may include a communications medium (not shown).

Figure 27:
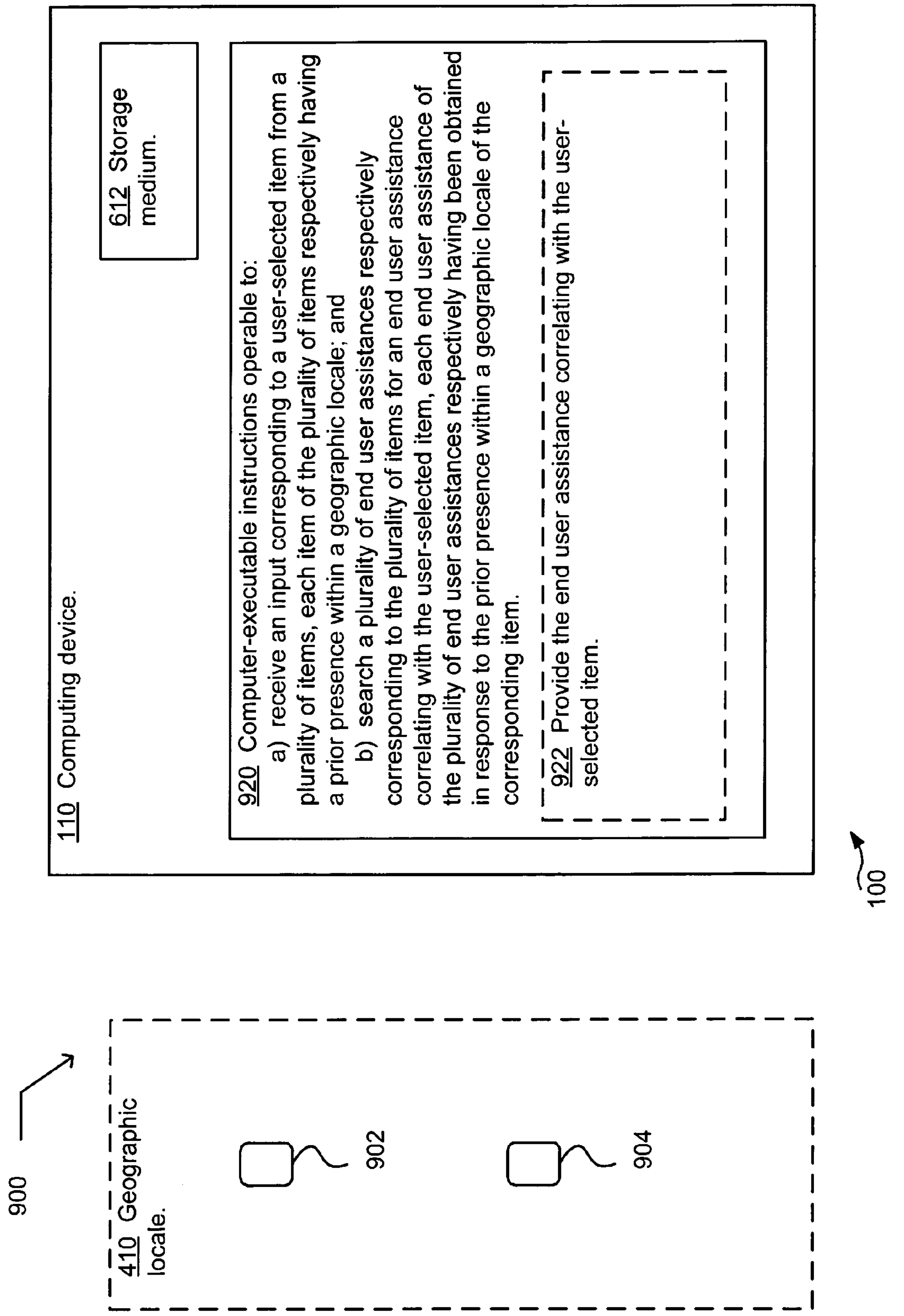
FIG. 27 illustrates an exemplary system in which embodiments may be implemented.

FIG. 27 illustrates an exemplary system 900 in which embodiments may be implemented. The system 900 includes a computing system environment, illustrated as the computing system environment 100 and the computing device 110 of FIG. 2. A plurality of items is illustrated as an item 902 and an item 904 located within a geographic locale, illustrated as the geographic locale 410 of FIGS. 12 and 13. The system 900 further includes a computer program product (not shown) encoding a computer program for executing on the computing device 110 a computer process for obtaining an end user assistance correlating with the user-selected item. The computer process includes instructions 920 that when executed on the computing device cause the computing device to receive an input corresponding to a user-selected item from a plurality of items. Each item of the plurality of items respectively having a prior presence within a geographic locale. The instructions further cause the computing device to search a plurality of end user assistances respectively corresponding to the plurality of items for an end user assistance correlating with the user-selected item. Each end user assistance of the plurality of end user assistances respectively having been obtained in response to the prior presence of the corresponding item within the geographic locale. In an alternative embodiment, the instructions may include an instruction 922 that further causes the computing device to provide the end user assistance correlating with the user-selected item.

Figure 28:
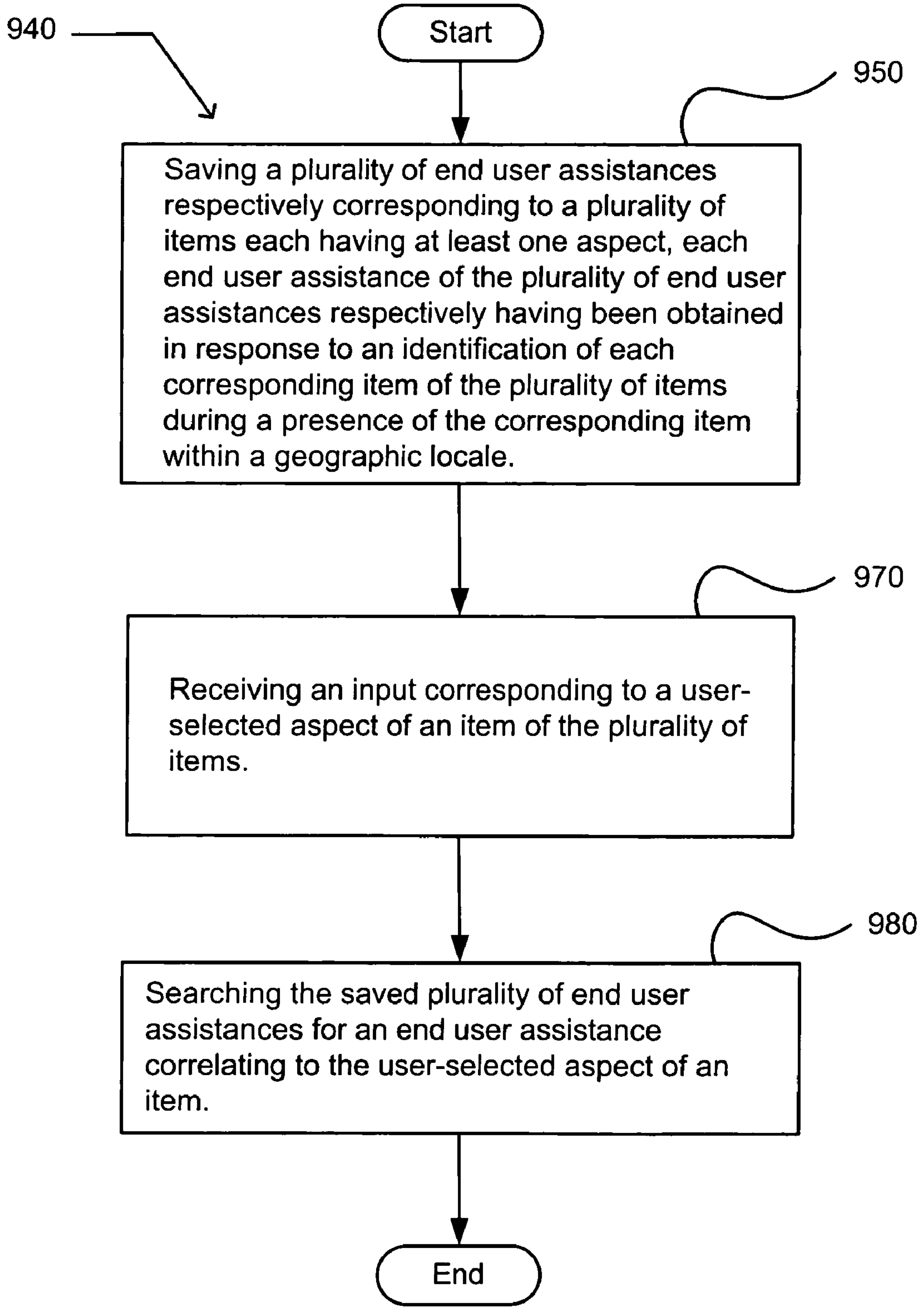
FIG. 28 illustrates an operational flow representing exemplary operations that search for a saved end user assistance.

FIG. 28 illustrates an operational flow 940 representing exemplary operations that searches for a saved end user assistance. After a start operation, the operational flow 940 moves to a storage operation 950. At the storage operation 950, a plurality of end user assistances are saved. The end user assistances respectively correspond to a plurality of items each having at least one aspect. Each end user assistance of the plurality of end user assistances respectively having been obtained in response to an identification of each corresponding item of the plurality of items during a presence within a geographic locale of the corresponding item. At an acquire operation 970, an input is received corresponding to a user-selected aspect of an item of the plurality of items. At a locate operation 980, the saved plurality of end user assistances is searched for an end user assistance correlating to the user-selected aspect of an item. The operational flow 940 then moves to an end operation.

Figure 29:
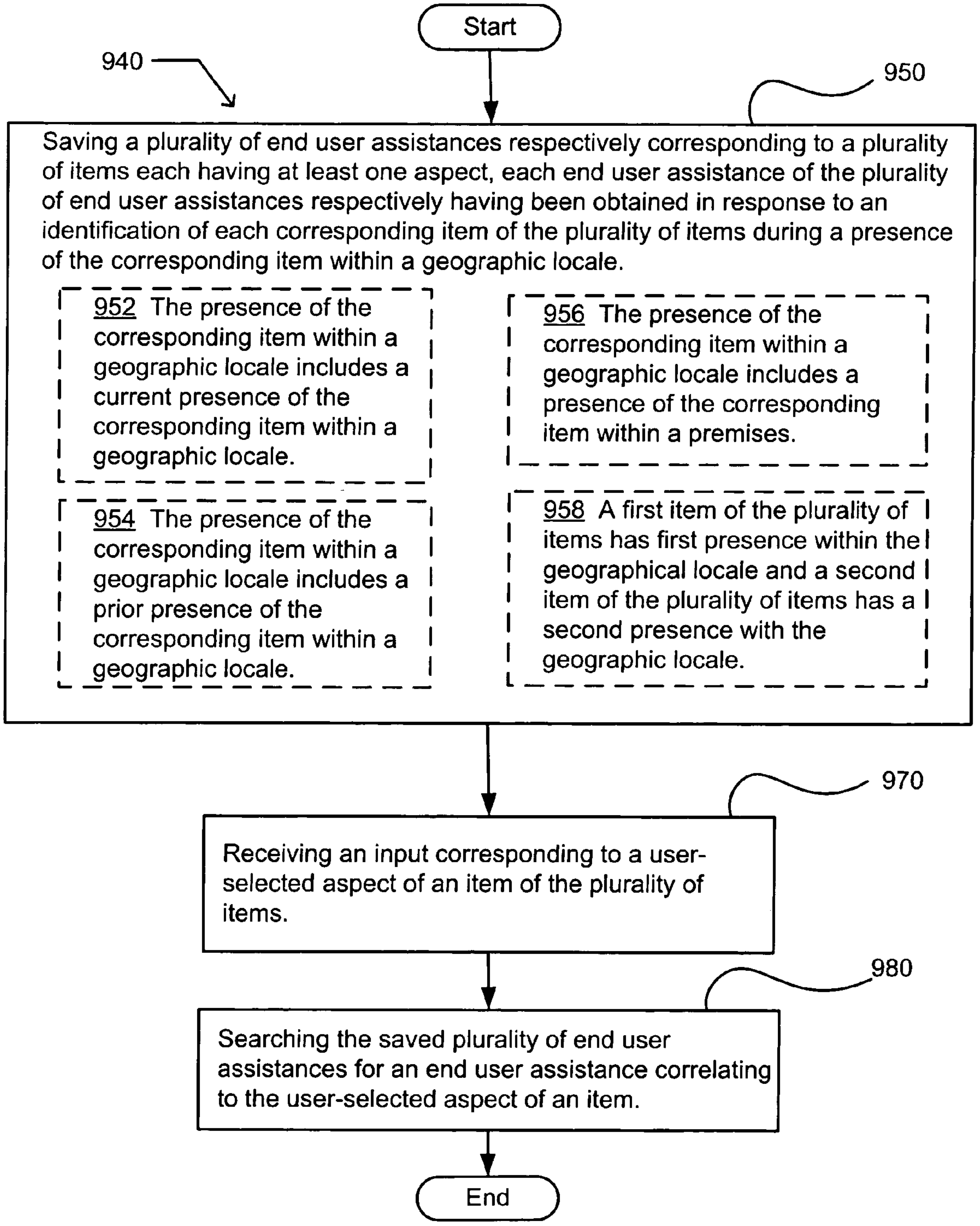
FIG. 29 illustrates a further alternative embodiment of the exemplary operational flow of FIG. 28.

FIG. 29 illustrates a further alternative embodiment of the exemplary operational flow 940 of FIG. 28. FIG. 29 illustrates an embodiment where the storage operation 950 may include at least one additional operation. Additional operations may include an operation 952, an operation 954, an operation 956, and an operation 958. At the operation 952, the presence of the corresponding item within a geographic locale includes a current presence of the corresponding item within a geographic locale. At the operation 954, the presence of the corresponding item within a geographic locale includes a prior presence of the corresponding item within geographic locale. At the operation 956, the presence of the corresponding item within a geographic locale includes a presence of the corresponding item within a premises. At the operation 958, a first item of the plurality of items has first presence within the geographical locale and a second item of the plurality of items has a second presence with the geographic locale.

Figure 30:
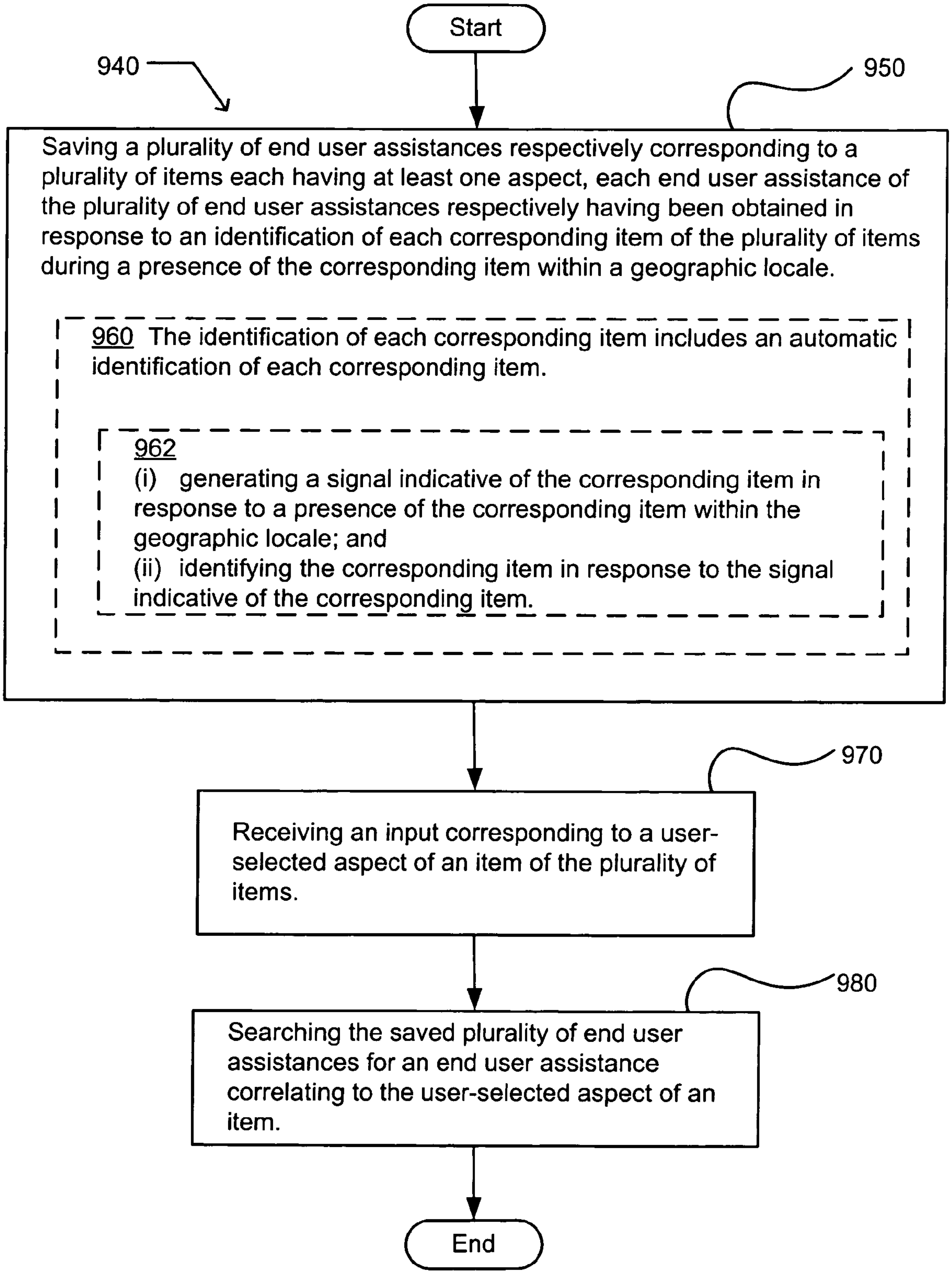
FIG. 30 illustrates another alternative embodiment of the exemplary operational flow of FIG. 28.

FIG. 30 illustrates a further alternative embodiment of the exemplary operational flow 940 of FIG. 28. FIG. 30 illustrates an embodiment where the storage operation 950 may include at least one additional operation. An additional operation may include an operation 960, wherein the identification of each corresponding item includes an automatic identification of each corresponding item. The operation 960 may included least one additional operation, such as an additional operation 962. At the operation 962, the operation 960 further includes generating a signal indicative of the corresponding item in response to a presence of the corresponding item within the geographic locale, and identifying the corresponding item in response to the signal indicative of the corresponding item.

Figure 31:
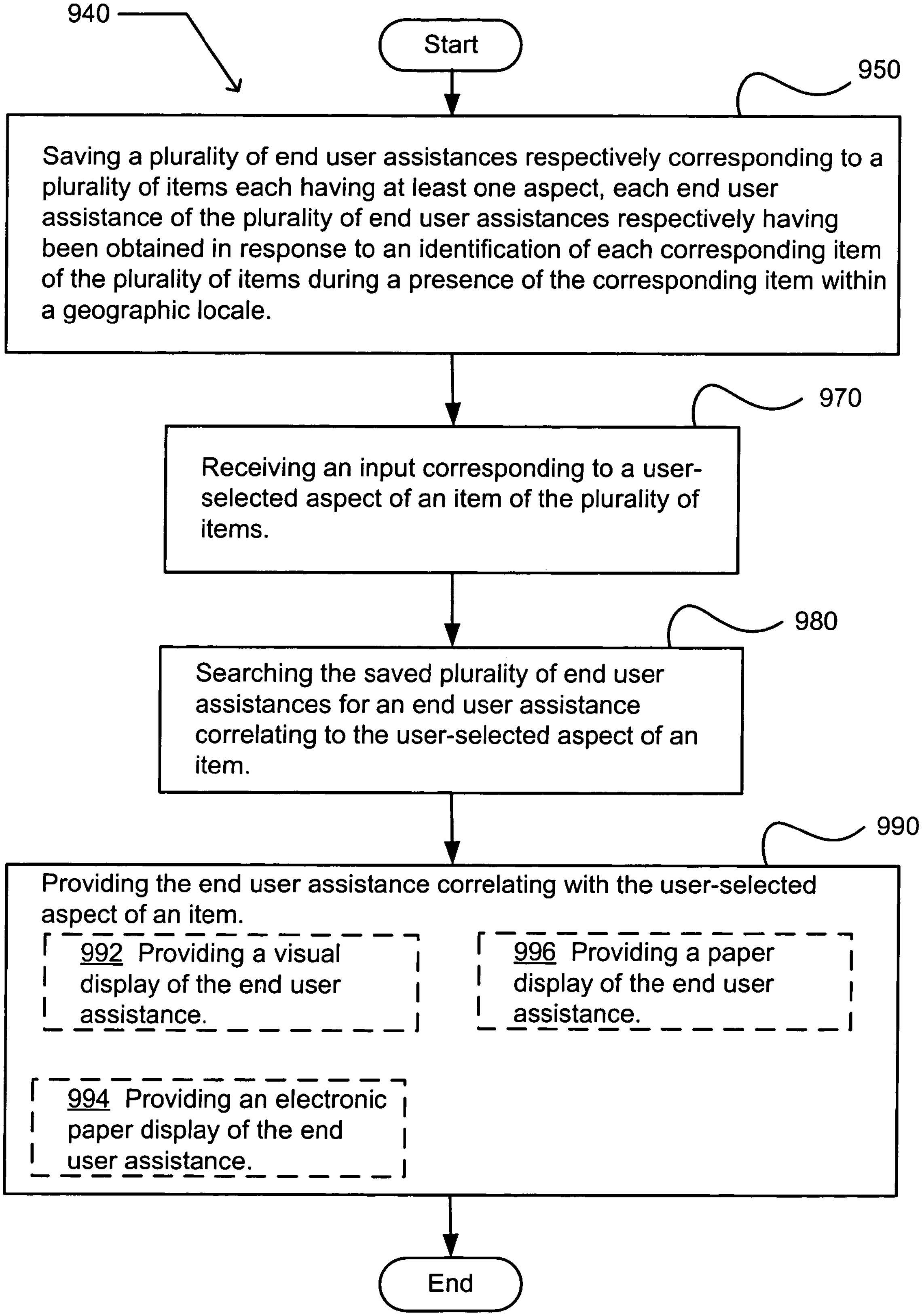
FIG. 31 illustrates a further alternative embodiment of the exemplary operational flow of FIG. 28.

FIG. 31 illustrates a further alternative embodiment of the exemplary operational flow 940 of FIG. 28. FIG. 31 illustrates an embodiment where the operational flow 940 may include at least one additional operation, such as an operation 990. At the operation 990, the end user assistance correlating with the user-selected aspect of an item is provided. The operation 990 may include at least one additional operation. An additional operation may include an operation 992, an operation 994, and an operation 996. At the operation 992, a visual display of the end user assistance is provided. At the operation 994, an electronic paper display of the end user assistance is provided. At the operation 996, a paper display of the end user assistance is provided.

Figure 32:
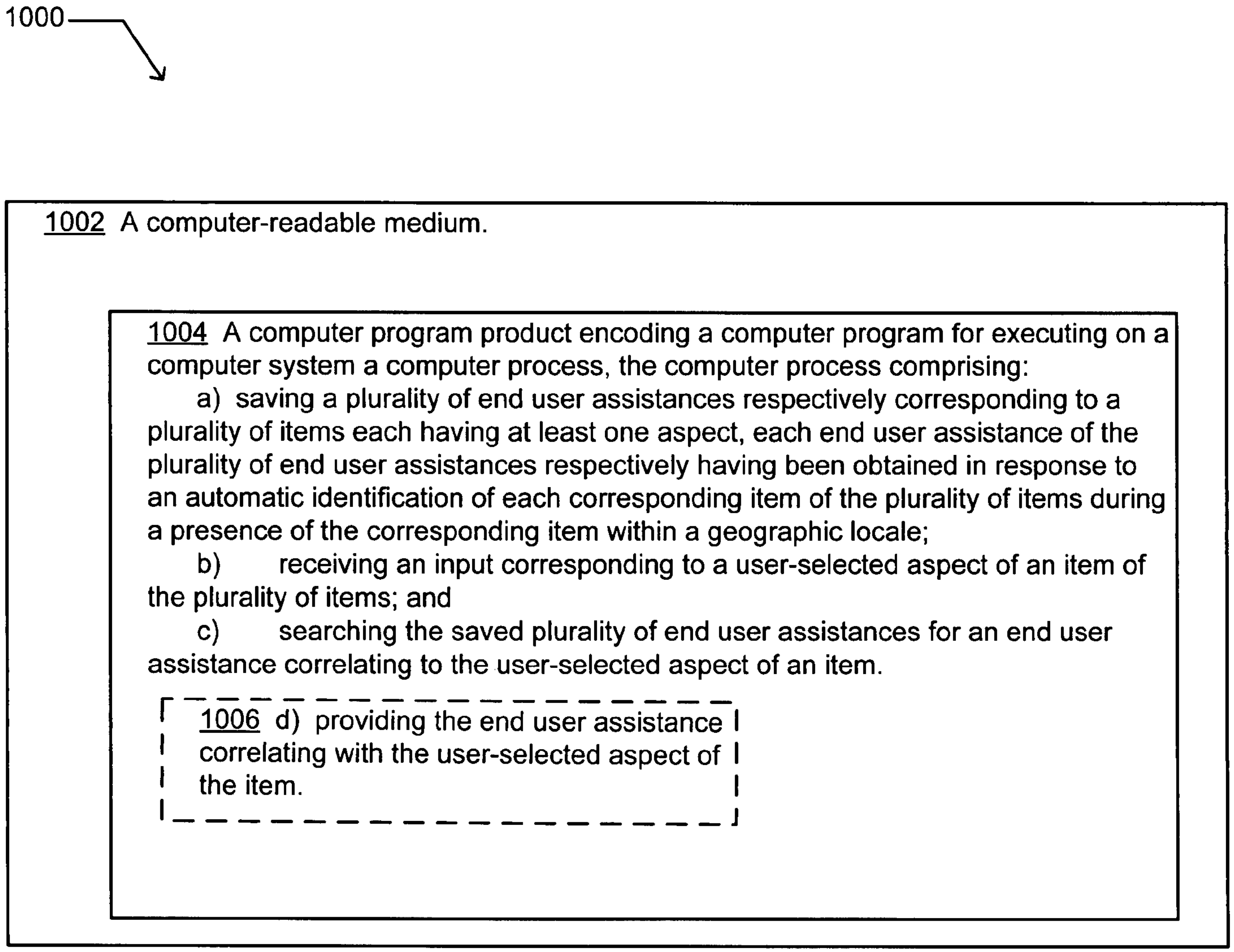
FIG. 32 illustrates a partial view of an exemplary computer program product that includes a computer program for executing a computer process on a computing device.

FIG. 32 illustrates a partial view of an exemplary computer program product 1000 that includes a computer program 1004 for executing a computer process on a computing device. An embodiment of the exemplary computer program product 1000 may be provided using the computer-readable medium 1002, and includes computer executable instructions. The computer executable instructions encode the computer program 1004 for executing on a computer system a process that includes saving a plurality of end user assistances respectively corresponding to a plurality of items each having at least one aspect. Each end user assistance of the plurality of end user assistances respectively having been obtained in response to an automatic identification of each corresponding item of the plurality of items during a presence of the corresponding item within a geographic locale. The process further includes receiving an input corresponding to a user-selected aspect of an item of the plurality of items, and searching the saved plurality of end user assistances for an end user assistance correlating to the user-selected aspect of an item. In an alternative embodiment, the process may include at least one additional instruction. Additional instructions may include an instruction 1006, providing the end user assistance correlating to the user-selected aspect of the item. The computer-readable medium 1002 may include a computer storage medium, which may be carried by a computer-readable carrier (not shown). The computer-readable medium 1002 may include a communications medium (not shown).

Figure 33:
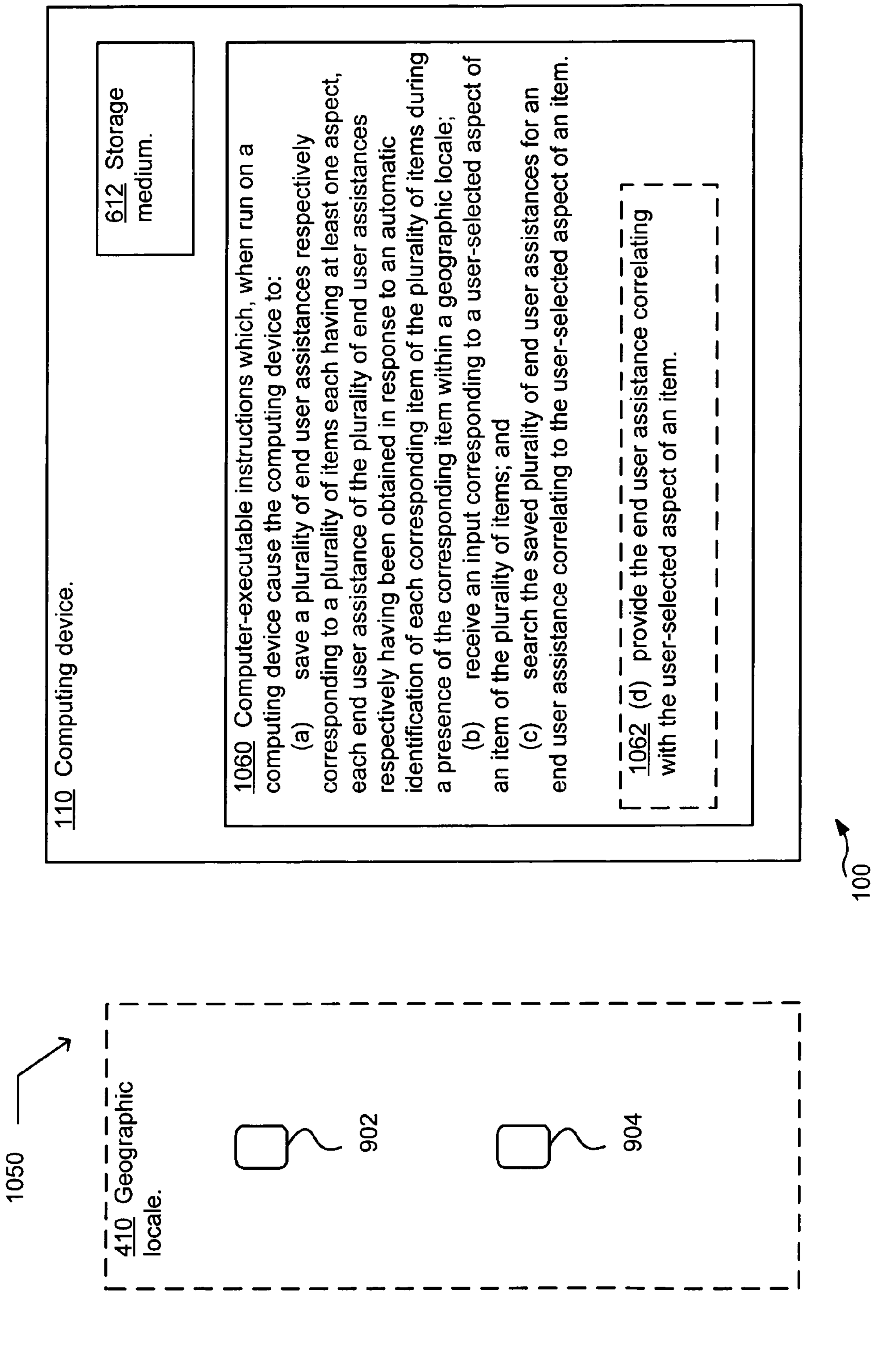
FIG. 33 illustrates an exemplary system in which embodiments may be implemented.

FIG. 33 illustrates an exemplary system 1050 in which embodiments may be implemented. The system 1050 includes a computing system environment, illustrated as the computing system environment 100 and the computing device 110 of FIG. 2. A plurality of items, illustrated as an item 902 and an item 904, are located within a geographic locale, such as the geographic locale 410 of FIGS. 12 and 13. The system 1050 further includes the storage medium 612, and computer program product 1060. The computer program product 1060 encodes a computer program for executing on the computing device 110 a computer process for searching for an end user assistance correlating with the user-selected aspect of an item. The computer process includes instructions that when executed on the computing device cause the computing device to save a plurality of end user assistances respectively corresponding to a plurality of items each having at least one aspect. Each end user assistance of the plurality of end user assistances respectively having been obtained in response to an automatic identification of each corresponding item of the plurality of items during a presence within a geographic locale of the corresponding item. The instructions further cause the computing device to receive an input corresponding to a user-selected aspect of an item of the plurality of items, and search the saved plurality of end user assistances for an end user assistance correlating to the user-selected aspect of an item. In an alternative embodiment, the computer program product 1060 may include additional instructions, such as the instruction 1062 that causes the computing device to provide the end user assistance correlating with the user-selected item.

Figure 34:
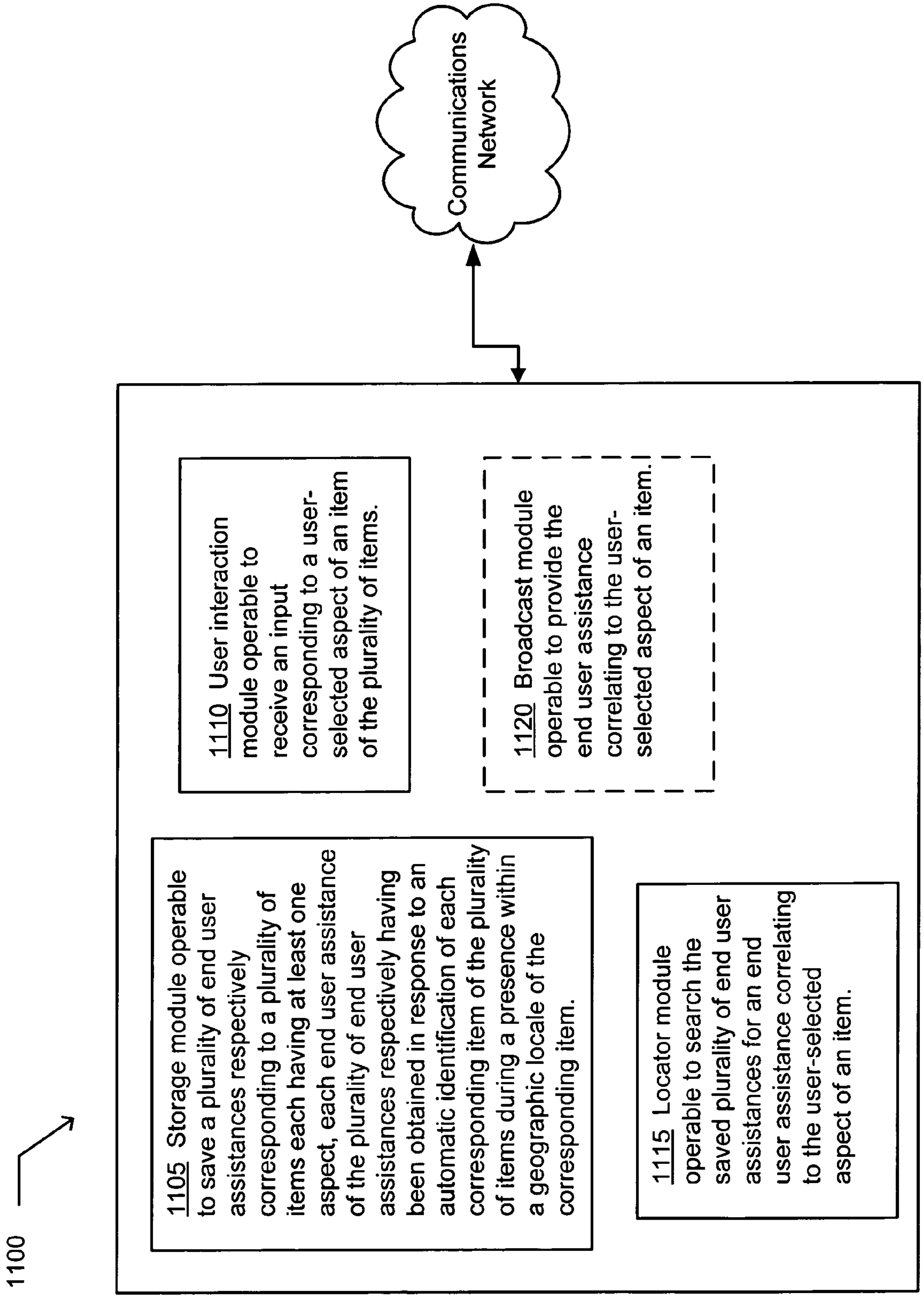
FIG. 34 includes an exemplary system in which embodiments may be implemented.

FIG. 34 includes an exemplary system 1100 in which embodiments may be implemented. The system 1100 includes a storage module 1105, a user interaction module 1110, and a locator module 1115. The storage module 1105 includes an operability to save a plurality of end user assistances respectively corresponding to a plurality of items each having at least one aspect. Each end user assistance of the plurality of end user assistances respectively having been obtained in response to an automatic identification of each corresponding item of the plurality of items during a presence within a geographic locale of the corresponding item. The user interaction module 1110 includes an operability to receive an input corresponding to a user-selected aspect of an item of the plurality of items. The locator module 1115 includes an operability to search the saved plurality of end user assistances for an end user assistance correlating to the user-selected aspect of an item. In an alternative embodiment, the system 1100 may include at least one additional module. An additional module may include a broadcast module 1120 operable to provide the end user assistance correlating to the user-selected aspect of an item.

Figure 35:
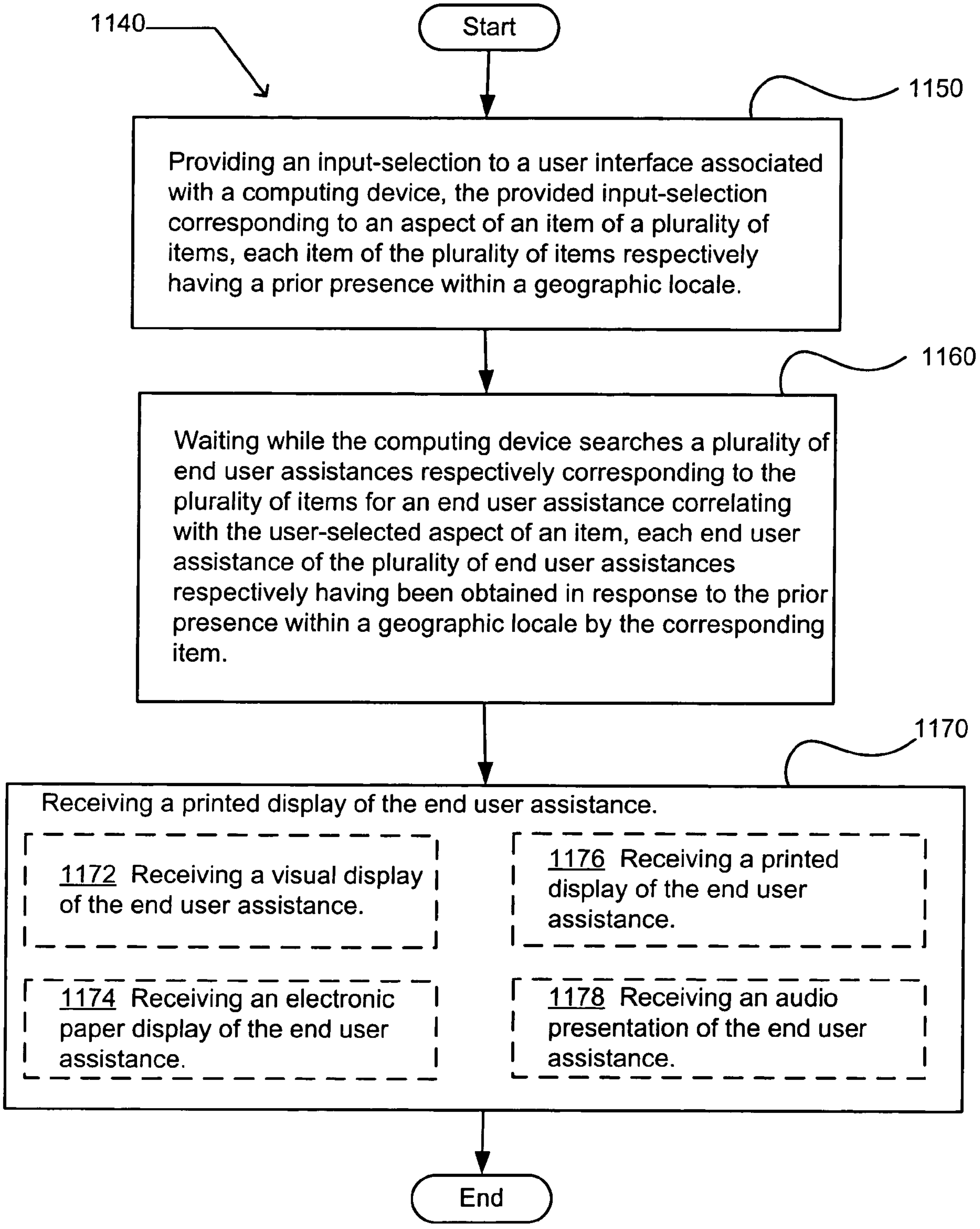
FIG. 35 illustrates an operational flow representing exemplary operations that receive an end user assistance.

FIG. 35 illustrates an operational flow 1140 representing exemplary operations that receive an end user assistance. After a start operation, the operation flow 1140 moves to an input-selection operation 1150. At the input-selection operation 1150, an input-selection is provided to a user interface associated with a computing device. The provided input-selection corresponds to an aspect of an item of a plurality of items. Each item of the plurality of items respectively having a prior presence within a geographic locale. At a waiting operation 1160, the computing device searches a plurality of end user assistances respectively corresponding to the plurality of items for an end user assistance correlating with the user-selected aspect of an item. Each end user assistance of the plurality of end user assistances respectively having been obtained in response to the prior presence within a geographic locale of the corresponding item. At a reception operation 1170, an end user assistance is received correlating to the input-selection. In an alternative embodiment, the reception operation 1170 may include at least one additional operation. Additional operations may include an operation 1172, an operation 1174, an operation 1176, and an operation 1178. At the operation 1172, a visual display of the end user assistance is received. At the operation 1174, an electronic paper display of the end user assistance is received. The operation 1176, a printed display of the end user assistance is received. At operation 1178, an audio presentation of the end user assistance is received.

Figure 36:
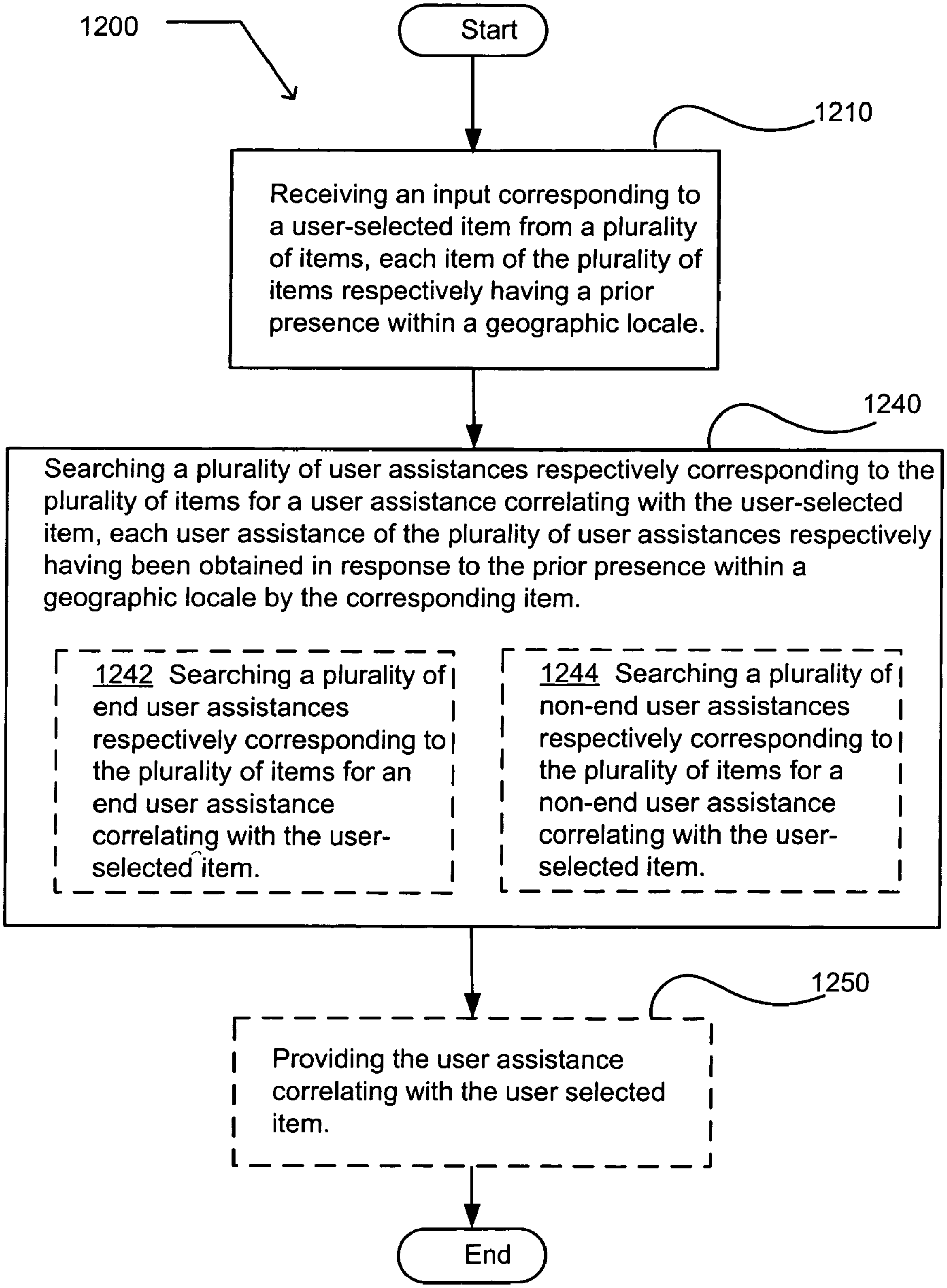
FIG. 36 illustrates an operational flow representing exemplary operations implemented in a computing device that searches a plurality of user assistances for a user assistance.

FIG. 36 illustrates an operational flow 1200 representing exemplary operations implemented in a computing device that searches a plurality of user assistances for a user assistance. After a start operation, the operational flow moves to a user interaction operation 1210. At the operation 1210, an input is received corresponding to a user-selected item from a plurality of items, each item of the plurality of items respectively having a prior presence within a geographic locale. At a seeking operation 1240, a plurality of user assistances respectively corresponding to the plurality of items are searched for a user assistance correlating with the user-selected item. Each user assistance of the plurality of user assistances respectively having been obtained in response to the prior presence within a geographic locale of the corresponding item. In an alternative embodiment, the process 1200 may include additional operations, such as a broadcast operation 850. At the operation 850, the user assistance correlating with the user-selected item is provided. The operational flow 1200 then moves to an end operation. In another alternative embodiment, the seeking operation 1240 may include at least one additional operation. Additional operations may include an operation 1242 and an operation 1244. At the operation 1242, a plurality of end user assistances respectively corresponding to the plurality of items are searched for an end user assistance correlating with the user-selected item. At the operation 1244, a plurality of non-end user assistances respectively corresponding to the plurality of items are searched for a non-end user assistance correlating with the user-selected item.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flow diagrams, operation diagrams, flowcharts, illustrations, and/or examples. Insofar as such block diagrams, operation diagrams, flowcharts, illustrations, and/or examples contain one or more functions and/or operations, it will be understood by those within the art that each function and/or operation within such block diagrams, operation diagrams, flowcharts, illustrations, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as “open” terms (e.g., the term “including” should be interpreted as “including but not limited to,” the term “having” should be interpreted as “having at least,” the term “includes” should be interpreted as “includes but is not limited to,” etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases “at least one” and “one or more” to introduce claim recitations. However, the use of such phrases should not be construed to imply that the introduction of a claim recitation by the indefinite articles “a” or “an” limits any particular claim containing such introduced claim recitation to inventions containing only one such recitation, even when the same claim includes the introductory phrases “one or more” or “at least one” and indefinite articles such as “a” or “an” (e.g., “a” and/or “an” should typically be interpreted to mean “at least one” or “one or more”); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of “two recitations,” without other modifiers, typically means at least two recitations, or two or more recitations). Furthermore, in those instances where a convention analogous to “at least one of A, B, and C, etc.” is used, in general such a construction is intended in the sense one having skill in the art would understand the convention (e.g., “a system having at least one of A, B, and C” would include but not be limited to systems that have A alone, B alone, C alone, A and B together, A and C together, B and C together, and/or A, B, and C together, etc.). In those instances where a convention analogous to “at least one of A, B, or C, etc.” is used, in general such a construction is intended in the sense one having skill in the art would understand the convention (e.g., “a system having at least one of A, B, or C” would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively “associated” such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components.

What is claimed is:

1. A method comprising:

a) receiving an input corresponding to a user-selected item having an embedded electronic device from a plurality of items respectively having an embedded electronic device, each item of the plurality of items respectively having had a prior presence within a geographic locale;

b) searching a plurality of end user assistances respectively corresponding to the plurality of items for an end user assistance correlating with the user-selected item, each end user assistance of the plurality of end user assistances having been obtained in response to an automatic identification of each item of the plurality of items during a prior presence within the geographic locale, the automatic identification of each item of the plurality of items including:

(i) receiving a signal indicative of the item in response to a presence of the item within the geographic locale; and (ii) identifying the item in response to the signal indicative of the item; and c) saving the end user assistance correlating with the user-selected item.

2. The method of claim 1, wherein the receiving an input corresponding to a user-selected item having an embedded electronic device from a plurality of items respectively having an embedded electronic device includes receiving an input corresponding to a user-selected apparatus having an embedded electronic device from a plurality of apparatus respectively having an embedded electronic device.

3. The method of claim 1, wherein the receiving an input corresponding to a user-selected item respectively having an embedded electronic device from a plurality of items having an embedded electronic device includes receiving an input corresponding to a user-selected apparatus having an embedded electronic device from a plurality of apparatus respectively having an electronic device.

4. The method of claim 1, wherein the each item of the plurality of items respectively having had a prior presence within a geographic locale includes each item of the plurality of items respectively having had a prior physical presence within a premises.

5. The method of claim 1, wherein the each end user assistance of the plurality of end user assistances having been obtained in response to a recognition of the prior presence within the geographic locale of each item of the plurality of items includes each end user assistance of the plurality of end user assistances having been obtained in response to an identification of each item of the plurality of items during a prior presence within the geographic locale.

6. The method of claim 1, wherein the searching a plurality of end user assistances respectively corresponding to the plurality of items for an end user assistance correlating with the user-selected item includes searching a plurality of end user assistances for information correlating with the user-selected item.

7. The method of claim 1, wherein the searching a plurality of end user assistances respectively corresponding to the plurality of items for an end user assistance correlating with the user-selected item includes searching a plurality of end user assistances for instructions correlating with the user-selected item.

8. The method of claim 1, wherein the searching a plurality of end user assistances respectively corresponding to the plurality of items for an end user assistance correlating with the user-selected item includes searching a plurality of saved end user assistances for an end user assistance correlating with the user-selected item.

9. The method of claim 1, further comprising:

d) providing the end user assistance correlating with the user-selected item.

10. A computer program product embodied in a computer readable storage medium and encoding a computer program for executing on a computer system a computer process, the computer process comprising:

a) receiving an input corresponding to a user-selected item having an embedded electronic device from a plurality of items respectively having an embedded electronic device, each item of the plurality of items respectively having had a prior physical presence within a geographic locale;

b) searching a plurality of end user assistances respectively corresponding to the plurality of items for an end user assistance correlating with the user-selected item, each end user assistance of the plurality of end user assistances having been obtained in response to an automatic recognition of the prior physical presence of each item of the within a geographic locale, the automatic identification of each item of the plurality of items including:

(i) receiving a signal indicative of the item in response to a presence of the item within the geographic locale; and (ii) identifying the item in response to the signal indicative of the item; and c) saving the end user assistance correlating with the user-selected item.

11. The computer program product of claim 10, wherein the process further comprises:

providing the end user assistance correlating with the user-selected item.

12. The computer program product of claim 10, wherein the computer program product includes a computer storage medium.

13. A system comprising:

a) a computing device; and b) instructions embodied in a computer readable storage medium that when executed on the computing device cause the computing device to:

(i) receive an input corresponding to a user-selected item having an embedded electronic device from a plurality of items respectively having an embedded electronic device, each item of the plurality of items respectively having a prior presence within a geographic locale;

(ii) search a plurality of end user assistances respectively corresponding to the plurality of items for an end user assistance correlating with the end-user selected item, each end user assistance of the plurality of end user assistances having been obtained in response to an automatic recognition of the prior presence within the geographic locale of each item of the plurality of the respective items during a prior presence within the geographic locale, the automatic identification of each item of the plurality of items including:

1) receiving a signal indicative of the item in response to a presence of the item within the geographic locale; and 2) identifying the item in response to the signal indicative of the item; and (iii) save the end user assistance correlating with the user-selected item.

14. The system of claim 13, wherein the instructions further include:

provide the end user assistance correlating with the user-selected item.

15. A method comprising:

a) saving a plurality of end user assistances respectively corresponding to a plurality of electronic devices each having at least one aspect, each end user assistance of the plurality of end user assistances respectively having been obtained in response to an automatic identification of each electronic device of the plurality of electronic devices during a prior presence within a geographic locale, the automatic identification of each electronic device of the plurality of electronic device including:

(i) receiving a signal indicative of the electronic device in response to a presence of the electronic device within the geographic locale; and (ii) identifying the electronic device in response to the signal indicative of the electronic device;

b) receiving an input corresponding to a user-selected aspect of an electronic device of the plurality of electronic devices;

c) searching the saved plurality of end user assistances for an end user assistance correlating to the user-selected aspect of an electronic device; and d) saving the end user assistance correlating with the user-selected aspect of an electronic device.

16. The method of claim 15, wherein the each end user assistance of the plurality of end user assistances respectively having been obtained in response to an identification of each electronic device of the plurality of electronic devices during a presence within a geographic locale includes each end user assistance of the plurality of end user assistances respectively having been obtained in response to an identification of each electronic device of the plurality of electronic devices during a presence within a premises.

17. The method of claim 15, wherein a first electronic device of the plurality of electronic devices has a first presence within the geographic locale and a second electronic device of the plurality of electronic devices has a second presence with the geographic locale.

18. The method of claim 15, wherein the identification of each electronic device of the plurality of electronic devices includes an automatic identification of each electronic device of the plurality of electronic devices.

19. The method of claim 15, further comprising:

d) providing the end user assistance correlating with the user-selected aspect of an electronic device.

20. A computer program product embodied in a computer readable storage medium and encoding a computer program for executing a computer process on a computer system, the computer process comprising:

a) saving a plurality of end user assistances respectively corresponding to a plurality of items each having an embedded electronic device and at least one aspect, each end user assistance of the plurality of end user assistances respectively having been obtained in response to an automatic identification of each item of the plurality of items during a prior presence within a geographic locale, the automatic identification of each electronic device of the plurality if item including:

(i) receiving a signal indicative of the item in response to a presence of the item within the geographic locale; and (ii) identifying the item in response to the signal indicative of the item;

b) receiving an input corresponding to a user-selected aspect of an item having an embedded electronic device and at least one aspect of the plurality of items having an embedded electronic device and at least one aspect;

c) searching the saved plurality of end user assistances for an end user assistance correlating to the user-selected aspect of an item; and d) providing the end user assistance correlating to the user-selected aspect of the item.

21. A method comprising:

a) providing an input-selection to a user interface associated with a computing device, the provided input-selection corresponding to an aspect of an electronic device of a plurality of electronic devices, each electronic device of the plurality of electronic devices respectively having had a prior recognized presence within a geographic locale;

b) waiting while the computing device searches a plurality of end user assistances respectively corresponding to the plurality of electronic devices for an end user assistance correlating with the user-selected aspect of an electronic device, each end user assistance of the plurality of end user assistances having been respectively obtained in response to an automatic identification of each electronic device of the plurality of electronic device during a prior presence within a geographic locale, the automatic identification of each electronic device of the plurality of items including:

(i) receiving a signal indicative of the electronic device in response to a presence of the electronic device within the geographic locale; and (ii) identifying the electronic device in response to the signal indicative of the electronic device; and c) receiving an end user assistance correlating to the input-selection.

22. A method comprising:

a) receiving an input corresponding to a user-selected apparatus from a plurality of apparatus, each apparatus of the plurality of apparatus respectively having a prior presence within a geographic locale;

b) searching a plurality of assistances respectively corresponding to the plurality of apparatus for an assistance correlating with the user-selected apparatus, each assistance of the plurality of user assistances having been respectively obtained in response to an automatic identification of each apparatus of the plurality of apparatus during a prior presence within a geographic locale, the automatic identification of each apparatus of the plurality of apparatus including:

(i) receiving a signal indicative of the apparatus in response to a presence of the apparatus within the geographic locale; and (ii) identifying the apparatus in response to the signal indicative of the apparatus; and c) saving the end user assistance correlating with the user-selected apparatus.

23. The method of claim 1, wherein the end user assistance includes at least one of an end user information corresponding to the user-selected item having an embedded electronic device, an end user instruction corresponding to the user-selected item having an embedded electronic device, an end user education corresponding to the user-selected item having an embedded electronic device, and/or an end user operation information corresponding to the user-selected item having an embedded electronic device.

24. A method comprising:

a) receiving an input corresponding to a user-selected item having an embedded electronic device from a plurality of items respectively having an embedded electronic device, each item of the plurality of items respectively having had a prior presence within a geographic locale;

b) searching a file that includes a plurality of end user assistances respectively corresponding to the plurality of items for an end user assistance correlating with the user-selected item, each end user assistance of the plurality of end user assistances having been added to the file in response to an automatic recognition of the prior presence of each item of the plurality of items within the geographic locale, the automatic recognition of each item of the plurality of items including:

(i) receiving a signal indicative of the item in response to a presence of the item within the geographic locale; and (ii) identifying the item in response to the signal indicative of the item; and c) saving the end user assistance correlating with the user-selected item.

* * * * *

UNITED STATES PATENT AND TRADEMARK OFFICE

CERTIFICATE OF CORRECTION

PATENT NO. : 7,664,736 B2
APPLICATION NO. : 11/037825
DATED : February 16, 2010
INVENTOR(S) : Edward K. Jung It is certified that error appears in the above-identified patent and that said Letters Patent is hereby corrected as shown below:

Title Page:

(*) Notice:

Delete "by 419 days" and insert -- by 815 --

Signed and Sealed this

Twenty-fourth Day of August, 2010

David J. Kappos
*Director of the United States Patent and Trademark Office*

UNITED STATES PATENT AND TRADEMARK OFFICE

CERTIFICATE OF CORRECTION

PATENT NO. : 7,664,736 B2
APPLICATION NO. : 11/037825
DATED : February 16, 2010
INVENTOR(S) : Edward K. Y. Jung et al.

It is certified that error appears in the above-identified patent and that said Letters Patent is hereby corrected as shown below:

Column 26, Line 38-39, Claim 10 should read:
-- recognition of the prior physical presence of each item of the plurality of items within a geographic locale, the automatic --

Column 27, Line 29, Claim 15 should read:
-- device of the plurality of electronic devices including: --

Column 28, Line 10-11, Claim 20 should read:
-- the automatic identification of each ~~electronic device~~ item of the plurality ~~i~~of items including: --

Column 28, Line 42, Claim 21 should read:
-- device of the plurality of electronic devices during --

Signed and Sealed this
Third Day of July, 2012

David J. Kappos
*Director of the United States Patent and Trademark Office*